(12) United States Patent
Strauser et al.

(10) Patent No.: US 6,887,290 B2
(45) Date of Patent: May 3, 2005

(54) DEBRIS SEPARATION AND FILTRATION SYSTEMS

(75) Inventors: Daniel P. Strauser, Elgin, IL (US); Sean Stuart Troutt, Dekalb, IL (US); Philip Wayne Stein, Friendswood, TX (US)

(73) Assignee: Federal Signal Corporation, Oak Brook, IL (US)

( * ) Notice: Subject to any disclaimer, the term of this patent is extended or adjusted under 35 U.S.C. 154(b) by 33 days.

(21) Appl. No.: 10/253,592

(22) Filed: Sep. 25, 2002

(65) Prior Publication Data

US 2004/0055470 A1 Mar. 25, 2004

(51) Int. Cl.$^7$ .............................................. B01D 50/00
(52) U.S. Cl. ............................. 55/283; 55/287; 55/302; 55/319; 55/337; 55/341.1; 55/349; 55/356; 55/417; 55/426; 55/459.1; 55/467; 96/421; 96/427; 96/428
(58) Field of Search .......................... 55/286, 287, 283, 55/337, 459.1, 341.1, 426, 417, 467, 356, 343, 350.1, 302, 319, 349, 346, 284; 96/421, 426, 427, 428

(56) References Cited

U.S. PATENT DOCUMENTS

| 2,799,355 A | 7/1957 | Easton |
| 2,800,976 A | * 9/1957 | Pellon ........................ 55/287 |
| 2,868,320 A | 1/1959 | Westlin |

(Continued)

FOREIGN PATENT DOCUMENTS

| EP | 0 343 061 A1 | 11/1989 |
| EP | 0 434 007 A2 | 6/1991 |
| EP | 0 800 360 B1 | 10/1997 |
| EP | 0 841 085 | 5/1998 |
| EP | 0 841 095 | 5/1998 |
| EP | 1 113 602 A2 | 7/2001 |
| EP | 1 181 886 | 2/2002 |
| EP | 1 062 047 | 5/2002 |
| GB | 323719 | 1/1930 |
| WO | WO 94/13387 | 6/1994 |
| WO | WO 98/35602 | 8/1998 |
| WO | WO 98/50131 | 11/1998 |
| WO | WO 98/52673 | 11/1998 |
| WO | WO 99/49978 | 10/1999 |
| WO | WO 00/03807 | 1/2000 |
| WO | WO 00/35330 | 6/2000 |
| WO | WO 00/36968 | 6/2000 |
| WO | WO 00/49933 | 8/2000 |
| WO | WO 01/45853 | 6/2001 |

OTHER PUBLICATIONS

Vactor Manufacturing Inc., Guzzler, ACE® Vacuum Loaders, brochure, Sep. 2000, Federal Signal Corp., Streator, Illinois.

Primary Examiner—Robert A. Hopkins
(74) Attorney, Agent, or Firm—Leydig, Voit & Mayer, Ltd.

(57) ABSTRACT

The invention provides a debris separation-filtration unit comprising a housing; an inlet that receives debris-laden air delivers the air in a tangential, centrifugal airflow-forming manner to the interior of housing; an inner shell that includes a number of airflow passageways; and a debris-capturing filter, the sides of which filter are at least substantially surrounded by the inner shell. Due to the formation of the centrifugal airflow and presence of the inner shell in the housing, only a portion of the debris particles entering the unit come in contact with the filter. The invention also provides debris collection, separation, and filtration systems comprising one or more of the separation-filtration units of the invention; debris collection vehicles comprising one or more of such units or systems; and related methods of collecting, separating, and filtering debris.

25 Claims, 14 Drawing Sheets

U.S. PATENT DOCUMENTS

| | | | |
|---|---|---|---|
| 2,974,748 A | * | 3/1961 | Swanson ............... 55/287 |
| 3,353,340 A | * | 11/1967 | Carsey ............... 55/324 |
| 3,424,501 A | | 1/1969 | Young |
| 3,483,677 A | | 12/1969 | Pinto |
| 3,648,442 A | * | 3/1972 | Bourne, Ronald F. ...... 55/294 |
| 3,716,967 A | | 2/1973 | Doyle, Jr. et al. |
| 3,895,929 A | | 7/1975 | Jysky et al. |
| 3,960,734 A | | 6/1976 | Zagorski |
| 3,969,096 A | | 7/1976 | Richard |
| 4,156,600 A | | 5/1979 | Jacobson |
| 4,198,726 A | | 4/1980 | Powell, Jr. |
| 4,201,256 A | | 5/1980 | Truhan |
| 4,218,226 A | | 8/1980 | Boozer |
| 4,336,040 A | | 6/1982 | Haberl |
| 4,348,215 A | | 9/1982 | Dehne |
| 4,384,215 A | | 5/1983 | Hirano et al. |
| 4,388,087 A | | 6/1983 | Tipton |
| 4,398,932 A | | 8/1983 | Dehne |
| 4,415,297 A | | 11/1983 | Boring |
| 4,445,912 A | | 5/1984 | Volk et al. |
| 4,572,726 A | | 2/1986 | Van Abbema |
| 4,572,783 A | | 2/1986 | Watson |
| 4,574,420 A | | 3/1986 | Dupre |
| 4,578,840 A | | 4/1986 | Pausch |
| 4,606,743 A | | 8/1986 | Shuman |
| 4,657,567 A | | 4/1987 | Callgren et al. |
| 4,695,299 A | | 9/1987 | Spadaro et al. |
| 4,701,080 A | | 10/1987 | van Aalst |
| 4,731,101 A | | 3/1988 | Kanda |
| 4,795,561 A | | 1/1989 | Aslin |
| 4,823,731 A | | 4/1989 | Howeth |
| 4,844,665 A | | 7/1989 | Howell |
| 4,848,990 A | | 7/1989 | Matsui |
| 4,853,008 A | | 8/1989 | Dyson |
| 4,853,011 A | | 8/1989 | Dyson |
| 4,865,627 A | | 9/1989 | Dewitz et al. |
| 4,944,780 A | | 7/1990 | Usmani |
| 4,963,172 A | | 10/1990 | DeMarco |
| 5,078,761 A | | 1/1992 | Dyson |
| 5,090,976 A | | 2/1992 | Dyson |
| 5,106,488 A | | 4/1992 | Jonasson |
| 5,116,395 A | | 5/1992 | Williams |
| 5,129,124 A | | 7/1992 | Gamou et al. |
| 5,145,499 A | | 9/1992 | Dyson |
| 5,163,786 A | | 11/1992 | Christianson |
| 5,180,407 A | | 1/1993 | DeMarco |
| 5,217,512 A | | 6/1993 | Williams |
| 5,236,479 A | | 8/1993 | Billingsley |
| 5,254,147 A | | 10/1993 | Finke |
| 5,271,751 A | | 12/1993 | Lägler |
| 5,307,538 A | | 5/1994 | Rench et al. |
| 5,320,188 A | | 6/1994 | England |
| 5,321,942 A | | 6/1994 | Hartness |
| 5,342,256 A | | 8/1994 | Amborn et al. |
| 5,352,256 A | | 10/1994 | Stead et al. |
| 5,409,512 A | | 4/1995 | Wilkerson et al. |
| 5,505,385 A | | 4/1996 | Gengler |
| 5,643,470 A | | 7/1997 | Amini |
| 5,681,450 A | | 10/1997 | Chitnis et al. |
| 5,746,795 A | | 5/1998 | Witter |
| 5,840,102 A | | 11/1998 | McCracken |
| 5,845,782 A | | 12/1998 | Depew |
| 5,879,545 A | | 3/1999 | Antoun |
| 5,893,936 A | | 4/1999 | Dyson |
| 5,946,767 A | | 9/1999 | Sinz |
| 5,948,127 A | | 9/1999 | Minakawa et al. |
| 5,958,094 A | | 9/1999 | Schwamborn et al. |
| 5,996,171 A | | 12/1999 | Bowers |
| 6,032,804 A | | 3/2000 | Paulson |
| 6,042,628 A | | 3/2000 | Nishikiori et al. |
| 6,141,826 A | | 11/2000 | Conrad et al. |
| 6,171,365 B1 | | 1/2001 | Schrey et al. |
| 6,195,835 B1 | | 3/2001 | Song et al. |
| 6,210,575 B1 | | 4/2001 | Chase et al. |
| 6,238,541 B1 | | 5/2001 | Sasaki et al. |
| 6,312,594 B1 | | 11/2001 | Conrad et al. |
| 6,341,404 B1 | | 1/2002 | Salo et al. |
| 6,344,064 B1 | | 2/2002 | Conrad |
| 2002/0020154 A1 | | 2/2002 | Byung-Sun Yang |
| 2002/0043055 A1 | | 4/2002 | Wayne Ernest Conrad |
| 2002/0066262 A1 | | 6/2002 | Jang-keun Oh |

* cited by examiner

DEBRIS SEPARATION AND FILTRATION SYSTEMS

FIELD OF THE INVENTION

This invention pertains to systems for collecting, separating, and filtering debris, debris collection vehicles comprising such systems, and related methods of collecting, separating, and filtering debris.

BACKGROUND OF THE INVENTION

Stationary and mobile vacuum debris collection systems have proven to be useful in a number of industrial and environmental applications. For example, truck-mounted vacuum cleaning systems have long been used to clean a wide variety of debris from areas such as waste collection areas of power plants, steel mills, and other industrial sites.

Typically, vacuum debris cleaning systems have one or more collection chambers into which collected debris material is deposited (such debris collection tanks or hoppers are commonly referred to as "debris bodies" in the art). A high velocity blower or fan generates a stream of air to flow through a flexible hose that induces the debris to flow from the debris collection site through a flexible hose to the debris body in which heavier debris particles are deposited. However, lighter debris particles remain in the air stream and continue to move toward the blower and the exhaust where the air stream is released to the environment.

Filter bags or sock filters are commonly employed to capture such fugitive airborne debris in vacuum cleaning systems. While generally effective at removing debris particles from the air stream, filter bags and sock filters become clogged quickly and, accordingly, must be cleaned and/or replaced frequently, when brought into contact with many types of airborne debris particles.

To improve the performance of bag and sock filtration systems, purge systems that agitate or shake the filters or periodically deliver a charge of compressed air to the filters have been proposed (see, e.g., U.S. Pat. Nos. 4,336,040 and 5,409,512). Unfortunately, in practice most shaker and agitator systems have been shown to make only modest improvements in filter life. Moreover, such systems may require a large number of mechanical and/or pneumatic components and thereby increase the cost of the system as well as the likelihood of system failure.

Another approach to improving the capture of airborne debris particles is to use a cyclone to separate heavier airborne debris particles before the air stream contacts the filter bags. Examples of such systems are described in European Patent Application 0 434 007 and U.S. Pat. No. 5,996,171. Such systems are further exemplified by Guzzler® Ace® vacuum trucks sold by the Federal Signal Corporation (Elgin, Ill., USA—www.elginsweeper.com). While effective in many respects, the effective filter life and efficiency in such serial cyclone separator/baghouse filter systems still often remains shorter than the period of desired operation.

For these and other reasons, there remains a need for improved and alternative devices and systems for handling airborne debris in debris collection systems. The invention provides such devices and systems, debris collection vehicles that incorporate such devices and systems, and methods of using such devices, systems, and vehicles. These and other advantages of the invention, as well as additional inventive features, will be apparent from the description of the invention provided herein.

BRIEF SUMMARY OF THE INVENTION

The invention provides debris separation and filtration devices (or units); debris collection, separation, and filtration systems comprising one or more of the inventive debris separation-filtration units; and related methods of collecting, separating, and filtering debris. The debris separation-filtration units and systems of the invention are useful as (or as part of) stationary and mobile debris collection systems. For example, in a preferred aspect, the invention provides a self-propelled debris-collecting vehicle including at least one of the inventive debris separation-filtration units.

In another exemplary aspect, the invention provides a combined debris separation and filtration device or unit that includes a housing including a cylindrical sidewall; an inlet port that communicatively engages the cylindrical sidewall; an inner shell positioned within the housing and that comprises a plurality airflow passageways; and a debris particle-capturing filter, the sides of which filter are at least substantially surrounded by the inner shell. The inlet is oriented such that debris-laden air entering the housing is tangentially directed with respect to the direct path from the inlet to the longitudinal (horizontal) center of the housing, such that a centrifugal debris particle-separating airflow is formed in the housing when sufficient airflow passes through the inlet. Due to the formation of the centrifugal airflow and the presence of the inner shell, at least a portion of the debris particles entering the system does not contact the filter.

In another representative aspect, the invention provides a separation-filtration unit having a housing, inlet, inner shell, and a filter, as described above, further characterized in that the inlet port engages the housing at a position that is substantially closer to the top end of the housing than the bottom end of the housing.

In alternative or related aspects, the invention provides a debris separation-filtration unit including a housing, an inlet, an inner shell, and a filter, as described above, characterized in that the housing includes a bottom debris collecting portion; a middle portion, at least a part of which middle portion is defined by the cylindrical sidewall; and a top portion. In such debris separation and filtration units, the inlet engages the middle portion; the top portion is at least partially separated from the middle portion, such that only filtered air enters the top end portion and exists the housing; and the bottom portion has a reduced diameter portion such that the speed of the centrifugal airflow is substantially reduced in the bottom portion and most of the debris particles deposited in the bottom portion do not contact or re-contact the filter.

A preferred feature of the invention is a combined debris separation-filtration unit including a housing, an inlet, and a filter, as described above, which unit also includes an inner shell that comprises a sidewall including a top perforated portion, about 20% or more of which is open to airflow; and a bottom perforated portion, about 60% or less of which is open to airflow. In a more particular aspect, the invention provides such a separation-filtration unit wherein the inner shell comprises an uneven distribution in (1) the number of airflow passageways, (2) the average size of airflow passageways, or (3) both (1) and (2), from the top end to the bottom end of the inner shell, such that there is less total perforated area in the top end than in the bottom end of the inner shell. In such aspects, the inner shell sidewall also typically includes a nonperforated top end portion, which nonperforated top end portion is positioned above the top perforated portion.

In a further exemplary aspect, the invention provides a dual unit centrifugal separation and filtration system, which dual centrifugal separation-filtration system includes a first selectively operable debris separation-filtration unit and a second selectively operable debris separation-filtration unit, both units being associated with an airflow-generating device that selectively motivates debris-laden air to flow into and through one or both units. Each of the separation-filtration units comprises a housing, an inlet that selectively receives and tangentially delivers the debris-laden air into the housing such that a centrifugal debris particle-separating airflow is generated in the housing when a sufficient airflow passes through the inlet, an inner shell comprising a plurality of airflow passageways (which inner shell preferably is characterized in having an uneven distribution in the number of such passageways and/or the size of such passageways from its top end to its bottom end), and a filter, the sides of which filter are at least substantially surrounded by the inner shell.

In a more particular representative aspect, the invention provides a dual mode, multiple unit, debris separation and filtration system, including (1) a plurality of debris separation-filtration units, each unit including a housing, an inlet, an inner shell, and a filter, as described above, each system also including or being associated with a selectively operable filter backflow purge system; (2) a detector and/or a timer, which detector and/or timer generates a signal in response to a particular condition, passage of a set period of time, or both (individually and/or collectively); and (3) an automated control system that receives the signal or signals generated by the detector, timer, or combination and that controls the operation of each purge system and the flow of debris-laden air into and/or through each unit. In operation of this preferred system, the detector and/or timer sends a signal to the control system or at least one component thereof, the control system blocks airflow into and/or through at least one of the separation-filtration units and engages the purge system of the least one unit, thereby causing the release of debris particles from the filter or filters of the at least one unit, wherein during the time the filter or filters are purged, at least one other unit of the system continues to receive debris-laden air and separate and filter debris particles from such air. Preferably, the purge system of each unit causes a flow of air to contact the filter or filters in the direction opposite the direction that debris-laden air contacts the filters.

In a more particular aspect, the invention provides a debris separation and filtration system including (1) first and second debris separation-filtration units, each unit including a housing, an inlet, an inner shell, and a filter, as described above; (2) a detection system, timer, or both; (3) a vacuum-generating device; (4) first and second vacuum passageways, each vacuum passageway permitting airflow from the first and second debris-filtration units, respectively, and the vacuum-generating device, and being associated with or comprising a selectively openable control valve that controls airflow in the vacuum passageway in response to a signal from the detector; and (5) a purge system that includes first and second backflow passageways, each backflow passageway permitting airflow between the first and second debris-filtration units, respectively, and the atmosphere or a portion of the system comprising air at a significantly higher air pressure than the air pressure in the units after applying the vacuum thereto, each backflow passageway also including or being associated with a selectively openable control valve that controls airflow in the passageway in response to signals from the detector. In operation of such a system, the vacuum-generating device creates airflow through any open vacuum passageways such that debris-laden air is delivered into the housing of any associated unit, separated by the centrifugal airflow in the associated unit(s), and filtered by the filter of the associated unit(s), during which time the vacuum generates a negative pressure in and upstream of the housing. Upon receipt of a signal from the detector, timer, or both (individually or collectively), (a) the first vacuum passageway closes and the first backflow passageway opens or (b) the second vacuum passageway closes and the second backflow passageway opens, wherein (a) or (b) occurs until a set period of time has passed, the signal ceases the pressure difference is eliminated, or any suitable combination thereof, such that a backflow of air is delivered from the atmosphere or point of higher pressure to the filter in the first or second separation-filtration unit that contacts the filter at a force sufficient to release at least a portion of the debris particles from the filter, wherein the other separation-filtration unit continues to receive, separate, and filter debris laden air during (a) or (b).

The invention also provides debris collection vehicles comprising one or more of the above-described debris separation-filtration units or systems. In one aspect the invention provides a satellite trailer comprising one or more debris separation-filtration units of the invention. In another aspect, the invention provides a self-powered debris collection vehicle comprising a self-propelled engine. In a particular aspect, the invention provides a self-powered vehicle comprising a liftable and/or tiltable frame supported, directly or indirectly, by a number of wheels, which liftable/tiltable frame supports a debris body and at least one debris separation-filtration unit of the invention and can be selectively raised to dump debris from the unit(s) and debris body.

The invention also provides methods of separating and filtering airborne debris particles. One exemplary method of the invention includes: (1) providing a debris collecting system comprising an airflow generator, an exhaust, and a debris separation-filtration unit having a housing, a tangentially-oriented inlet, an inner shell comprising a number of airflow passageways, and a filter, the sides of which filter are at least substantially surrounded by the inner shell, as described above; (2) generating an airflow in the vehicle, which airflow delivers the debris laden air into the housing by way of the inlet thereby forming a centrifugal airflow in the housing, such that at least a portion of the debris settle in the bottom of the housing without contacting the filter; (3) permitting a portion of the centrifugal airflow to pass through the airflow passageways; (4) filtering the portion of the centrifugal airflow that passes through the airflow passageways with the filter; and (5) exhausting the filtered air from the system.

The invention also provides a method of separating and filtering debris particles by a process that includes providing a debris collection vehicle comprising (1) first and second debris separation and filtration units, as described above, each unit comprising or being associated with a timer and/or a detector; and (2) an automated control system, which method includes (a) producing an airflow that causes debris-laden air to be delivered into the first and/or second units, wherein the unit or units receiving such debris-laden air subject such air to centrifugal separation and filtration; (b) detecting whether (i) the presence of a physical condition exists, (ii) a period of time has passed, or (iii) a combination thereof has occurred or is occurring with the detector, timer, or both, wherein existence of the event, passage of the period, or occurrence of the combination (individually and/or collectively) causes the detector to generate a signal that is transmitted to the automated control system; and (c)

automatically (i) blocking the flow of debris-laden air into and/or through the first unit and causing a backflow of air to purge the filter in the first unit or (ii) blocking the flow of debris-laden air into and/or through the second unit and causing a backflow of air to purge the filter in the second unit, in response to the signals, wherein one unit continues to receive, separate, and filter debris-laden air while the filter of the other unit is purged.

DETAILED DESCRIPTION OF THE INVENTION

Figure 1:
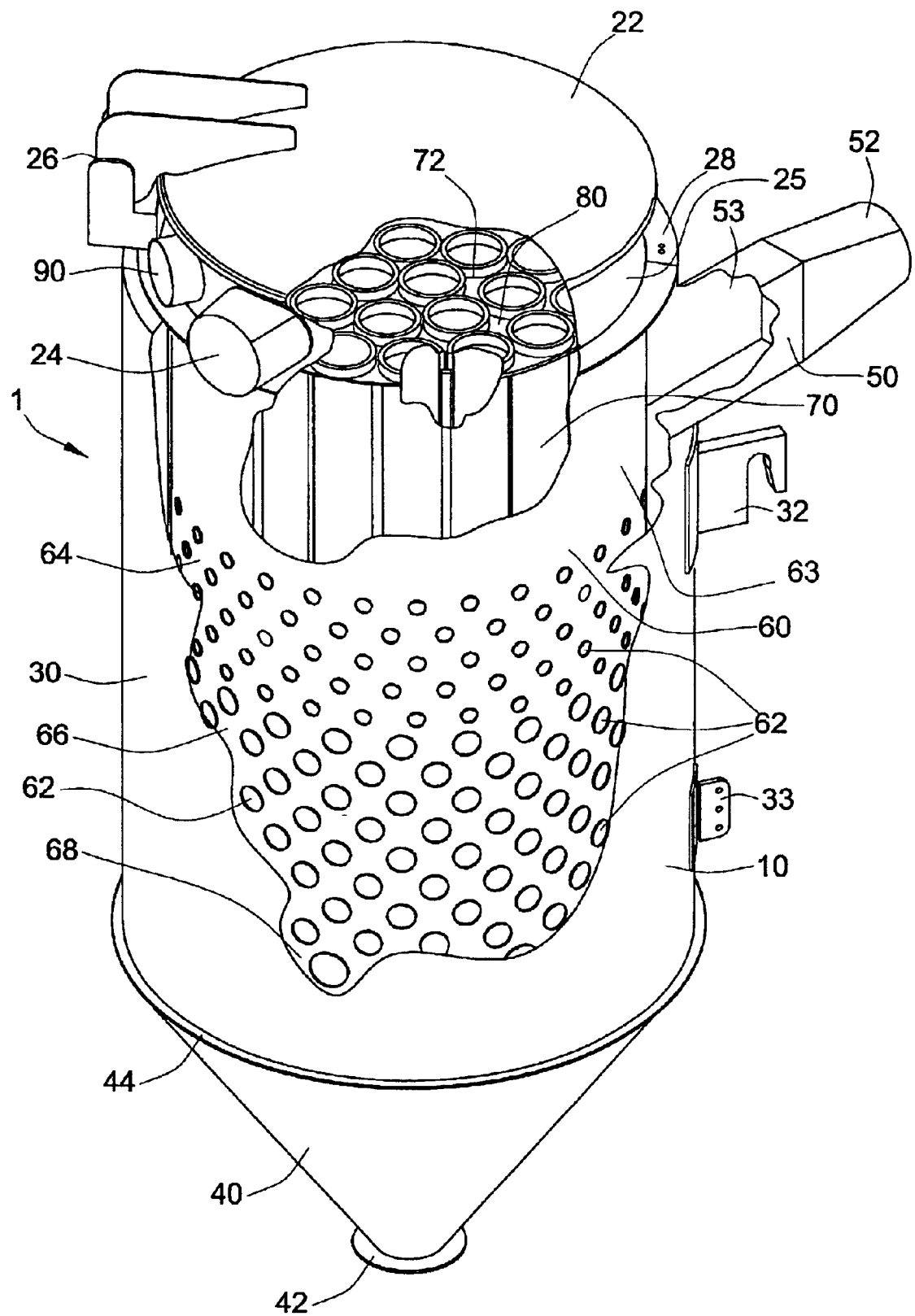
FIG. 1 is a partial cutaway and top isometric view of a representative combined debris separation-filtration unit of the invention.

The invention provides combined debris centrifugal separation and filtration devices (units) and debris collection, separation, and filtration systems, some of which systems are characterized in including one or more of such debris separation-filtration units. The debris separation-filtration units and systems of the invention are useful as, or as part of, stationary and mobile debris collection systems.

In one exemplary aspect, the invention provides a debris separation-filtration unit that includes a housing; an inlet port that receives debris-laden air and delivers the air in a tangential, centrifugal airflow-forming manner to the interior of housing when a sufficient airflow is present; an inner shell enclosed within the housing that includes a number of airflow passageways; and a debris-capturing filter, which filter also is enclosed within the housing in a position such that the sides of the filter are at least substantially surrounded by the inner shell. Due to the formation of the centrifugal debris-separating airflow and presence of the inner shell, only a portion of the debris particles entering the unit contacts the filter. As such, the filter in the inventive debris separation and filtration unit has a longer life and/or improved efficiency as compared to previously known debris filtration systems.

The housing can be any suitable container that, for example, (1) encloses the inner shell and filter, (2) retains debris particles and debris-laden air within its interior (i.e., is, in operation, substantially airtight and impenetrable to collected debris particles), and (3) has a shape that promotes and/or serves to maintain a centrifugal airflow in at least a significant portion of its interior. The housing can be formed from any suitable material that prohibits the release of airborne and deposited debris. Examples of suitable materials include steel (e.g., stainless steel) and rigid plastics (e.g., high density plastics such as ultra high molecular weight polyethylenes). A housing formed of $\frac{1}{8}$th to $\frac{1}{4}$ inch thick steel sidewall typically is preferred in truck mounted separation-filtration units and systems. Typically, the vertical height of the housing is substantially larger (e.g., about 2× or larger, about 2.5× or larger, or about 3× or larger) than the diameter of the housing. The size of the housing can vary with the desired use of the separation and filtration unit. Where the unit is used as part of a self-propelled vehicle debris collection system, the housing will desirably be of a size and configuration such that it can be readily mounted to and removed from a vacuum truck (e.g., by one or more hinges). In a stationary device or system (e.g., where the unit is relatively fixed in its location by welding), or where the unit is mounted on a trailer, the housing typically is larger than in such truck-mounted systems.

While the housing can have any suitable shape and configuration, a typical and preferred housing configuration comprises three portions: a bottom debris-collecting portion that includes a reduced diameter bottom end; a cylindrically shaped middle section that receives debris-laden air from an inlet; and a top manifold section that usually is separated from the middle portion in a manner such that only filtered air enters the top section from the middle section.

The bottom portion or bottom section of the preferred three-section housing configuration is designed to collect debris particles that are "peeled off from" (i.e., that fall out of) the centrifugal debris-separating airflow, released from a purged filter, or otherwise deposited in the bottom portion, without permitting such collected debris particles to contact or re-contact the filter. Typically, at least a part of the bottom portion has a size and shape such that airflow is restricted in and near the area where the debris are deposited. Thus, for example, the bottom debris-collecting portion can include a reduced diameter at its lower end. In this respect, the housing can comprise, for example, a conical or semi-hemispherical shaped bottom portion. A conical, funnel-shaped collection cone bottom portion is particularly preferred. Examples of units having housings that include a conical-shaped or semi-hemispherical-shaped bottom section are described in detail elsewhere herein.

The housing also or alternatively includes a transition section that serves to separate the collected debris in the collection cone from the middle portion of the housing where the centrifugal airflow is strongest. Thus, for example, the housing can include a bottom portion that comprises an upper transition section having a diameter substantially equal to that of the middle portion of the housing that serves to separate the middle portion of the housing from the reduced-diameter section in which collected debris are initially deposited.

The bottom portion of the housing usually does not surround any part of the inner shell or the filter. The interior of the bottom end portion typically is open and in direct communication with the central lower end of the middle portion interior, such that debris particles are able to gravitationally pass from the interior of the middle portion of the housing to the bottom portion.

The middle portion or middle section of the housing has a shape that facilitates formation of and/or maintenance of the centrifugal airflow. As such, the middle portion typically is formed from a cylindrical sidewall section. Commonly, the cylindrically shaped middle portion sidewall retains a constant horizontal (i.e., widthwise or longitudinal) diameter throughout, such that the radius from any portion of the sidewall to the widthwise center of the housing is substantially equal throughout the middle portion. The height of the middle portion usually is substantially larger than the depth of the bottom debris-collecting portion and the height of the top portion.

In the preferred three-section housing configuration, the interior of the middle portion preferably is separated from the interior of the top portion by a filter-retaining bulkhead (e.g., a sock filter-retaining tube plate), which bulkhead typically includes one or more passageways that permit filtered air to pass from the filters in the middle portion to the top portion. The top portion typically consists of an open chamber of relatively small height as compared to the middle portion. Typically, the top portion engages one or more outlets, through which outlet or outlets the filtered air exits the unit (e.g., the holes in a tube plate as described further elsewhere herein). Preferably, the top end of the top section or top portion is open, but engages an airtight lid that is closed in operation of the unit.

Most, if not all, of the middle portion sidewall surrounds the sides of the inner shell or inner tube. Typically and preferably, this surrounding sidewall and inner shell are in a concentric relationship. More particularly, but also typically and preferably, the surrounding middle portion sidewall, inner shell, and filter are all in a concentric relationship and at least one of the vertical ends of the inner shell (or inner shell sidewall in the case of an inner shell that includes one or more non-sidewall components), middle portion sidewall, and/or the filter are vertically aligned. The inner shell separates most, if not all, of the sides of filter from the rest of the interior of the housing's middle section. A unit typically includes only one inner shell and the inner shell typically is the only barrier or obstruction in the middle portion of the housing between the housing sidewall and the filter.

An inner shell can be formed of any material that is substantially impenetrable to debris particles that the unit might process (e.g., heavy mineral particles, small rocks, fly ash, and the like). For example, an inner shell can be formed from steel (e.g., stainless steel) or a rigid plastic material (e.g., an ultra high weight polyethylene), or any suitable combination of such materials. Preferably, an inner shell is formed from steel.

The height and width of an inner shell can vary depending on the size of the filter and the housing. In a particular aspect of the invention, the inner shell is characterized by having a height that is substantially equal to the height of the housing middle portion sidewall. The diameter or width of the inner shell is typically uniform throughout.

At least a portion of the housing sidewall surrounding the inner shell is separated from the exterior side of the inner shell sidewall, thereby forming a centrifugal separation chamber. A distance of about 3 inches to about 5 inches, preferably about 4 inches, between the exterior side of the inner shell and the interior of the housing sidewall typically is desired. A portion of the inner shell can contact the housing sidewall while having an inner shell sidewall that generally is separated from the surrounding housing sidewall so as to form a centrifugal separation chamber. Case in point, an inner shell can comprise a top lip or flange and/or a bottom lip or flange, one or both of which can engage a part of the housing, such that the inner shell is supported in the housing and the sidewall without requiring the sidewall of the inner shell to contact the surrounding sidewall of the housing.

Airflow passageways in the inner shell permit a portion of the air in the housing to pass through the shell and contact the filter. Typically, the orientation of the inner shell and filter are such that a substantially direct path of airflow exists between the centrifugal separation chamber and the filters. During debris separation and filtration, at least a portion of the airborne debris particles in the centrifugal separation chamber contact nonperforated or non-open parts of the inner shell, such that a portion of the debris entering the system is blocked from contacting the filter.

An inner shell can have any suitable shape. Desirably, an inner shell has a shape that promotes, supports, and/or otherwise serves to create and/or maintain a centrifugal airflow in at least a portion of the centrifugal separation chamber. The size and shape of the inner shell also desirably maximizes the space for the filters while accommodating a sufficient centrifugal airflow in the housing. In view of these considerations, an inner shell comprising a cylindrically shaped sidewall is preferred. A filter-retaining bulkhead typically engages and closes off the top of the inner shell. The bottom of the inner shell is open and in airflow communication with the central interior of the bottom debris-collection portion of the housing.

The inner shell comprises one or more airflow passageways that permit a portion of the air in the centrifugal separation chamber to pass through the shell and contact with the filter. Typically, the inner shell includes a number of such airflow passageways. The airflow passageways can take any suitable form and be of any suitable size so long as a sufficient airflow passes through the inner shell while the nonperforated portions of the inner shell block a portion of the debris-laden air from directly contacting the filter. For example, airflow passageways can consist of slits, holes, or alternatively shaped piercing formed in the inner shell. Typically and preferably, the airflow passageways consist of annular orifices of about 1.5–4 inches in diameter.

Preferably, the inner shell has more open or perforated area near the bottom end of the inner shell sidewall than near the top end. In a separation-filtration unit having the preferred three-section housing and such an inner shell, the airflow passageways preferably are distributed such that more air passes through the shell near the bottom of the middle portion of the housing than near the top of the middle portion. In such units, the centrifugal airflow near the bottom of the middle portion is slower and less forceful than at the top of the middle portion. Such a reduction in the centrifugal airflow near the bottom of the middle portion helps to ensure that collected debris particles in the debris-collecting bottom portion are not rendered airborne by the centrifugal airflow. In this respect, the topmost perforated area of the inner shell sidewall preferably is characterized by having about 20% or more open area (e.g., at least about 25% open area) and the bottom end of the inner shell sidewall is characterized by having about 60% or less open area (e.g., about 55% or less open area).

Preferably, the unit includes an inner shell that has a graduated amount of open area from the top perforated portion to the bottom perforated portion of the inner shell sidewall. Thus, for example, an inner shell sidewall can include one or more middle areas that have more open area than the top perforated portion of the inner shell sidewall, but less open area than the bottom perforated area of the sidewall.

To obtain such a differences in open area, the inner shell sidewall can include an uneven distribution in the number airflow passageways, the average size of the airflow passageways, or both, from the top end to the bottom end, such that the topmost perforated area of the inner shell sidewall comprises substantially less perforated area (i.e., less area open to airflow) than the bottom end. An uneven distribution in the number of airflow passageways is more typical and more preferred than a change in the diameter of airflow passageways.

The topmost portion of the inner shell sidewall, located above the topmost perforated portion, preferably lacks any airflow passageways. Preferably, an inner shell sidewall includes a top nonperforated portion that is large enough to require debris-laden air entering the centrifugal separation chamber to travel centrifugally at least once around the inner shell before passing through any airflow passageways. Thus, for example, about 20% or less, about 15%, about 10%, or less of an inner shell sidewall, at the topmost end of the sidewall, can lack any airflow passageways.

The bottom of the inner shell preferably engages a deflection flange that extends from the bottom end of the inner shell sidewall towards the surrounding housing sidewall. The deflection flange and surrounding sidewall do not contact. Thus, the deflection flange partially closes off the bottom of the centrifugal separation chamber. The deflection flange is preferably of a size such that it blocks much of the centrifugal airflow from reaching the bottom debris-collecting portion of the housing while permitting some portion of the debris peeled off in the centrifugal separation chamber to pass into the bottom portion. Usually, the deflection flange will traverse all but about ⅛th the width of the centrifugal separation chamber.

The inner shell preferably lacks and does not engage any bottom structure on the interior side of the inner shell sidewall, such that the bottom end of the filter is in direct airflow communication with the bottom portion of the housing and debris particles released from the filters (e.g., during filter purging) freely fall to the collection cone.

The inner shell, or at least the inner shell sidewall, at least substantially, and preferably completely, surrounds the sides of the debris particle-capturing filter, filters, or filtration system (which terms can be interchangeably used throughout). Normally, the inner shell concentrically surrounds the sides of the filter.

The exterior of the filter and the interior side of the inner shell usually are separated by a space. This space often is often about as wide as the centrifugal separation chamber, but can be less wide (e.g., the space can be about ¼th the width of the width of the centrifugal separation chamber).

A debris separation-filtration unit can include any suitable type of debris-collecting filter, filters, or filtration system. Typically, the "filter" consists of a number of filter elements, such as a bank of sock or bag filters. The individual filters in such units preferably are arranged to maximize the number of filters contained in the unit, normally by circularly arranging the filters in the inner space surrounded by the inner shell sidewall. In units comprising many filters, a distance preferably separates the filters such that debris-laden air passing through the airflow passageways contacts the top part of the filters in the middle portion of the housing and evenly engages the length of the filters.

As mentioned above, the filters normally are supported in the interior space surrounded by the inner shell sidewall from the bulkhead. The filters can engage the filter-retaining bulkhead in any suitable manner. In a typical arrangement, a number of sock or bag filters are passed through passageways in a tube plate bulkhead so that most of the filters are supported in the interior space except for the tops of the filters that set above the tube plate in the top portion of the housing.

Any suitable debris-capturing filter of any suitable size can be used in the separation-filtration units of the invention. Suitable filters include those commonly used to capture debris particles in debris filtering systems previously known in the art. The length of the portion of the filter suspended in the middle section of the housing typically is at least about 50% as tall as the middle portion sidewall, at least about 75% as tall as the middle portion sidewall, at least about 90% as tall as the middle portion sidewall, or taller.

One type of suitable debris-capturing filter is a sock filter. Typical sock filters are formed from a frame of separated metal rings connected by wires that extend the length of the filters and prevent dimpling. Such sock filters can be commercially obtained from a number of sources including Filtration Group (Aurora, Ill., USA) or BHA Group, Inc. (Kansas City, Kans., USA).

In some respects, cartridge debris-capturing filters are preferred. Cartridge filters provide more filter surface area than sock filters and, accordingly, are more efficient than such sock/bag filters. Because a unit of cartridge filter media has significantly more filter media than a corresponding unit of sock filter media, a lower can velocity (upward airflow in the unit) is desired in the operation of a unit comprising cartridge filters to ensure that the pleats of the filter are evenly fed debris-laden air. In other words, more air preferably passes through a unit diameter of cartridge filter media than passes through a corresponding unit diameter of sock filter media. The average can velocity in a separation-unit comprising a cartridge filter usually is about 50% or less the can velocity in a substantially identical unit comprising a bank of sock filters. The cartridge filter media also desirably has a high vacuum carrying capacity (i.e., a media stiffness) such that the filter media does not tear under normal debris separation and filtration conditions. Suitable debris-capturing cartridge filters are known in the art and can be obtained from a number of commercial sources, including BHA Group, Inc. and Filtration Group.

A filter used in the unit is preferably able to collect debris particles of at least about 10 microns or more in diameter. More preferably, each filter can collect debris particles of about 5 microns or more in diameter. Desirably, the filters collect a substantial proportion, if not essentially all, debris particles of such a size and larger that contact the filter. Due to the efficiency of the filter and centrifugal separator, filtered air can be released from a typical unit of the invention without additional filtration. For example, in system comprising a typical unit filtered air is exhausted to the environment/atmosphere without being subjected to any additional filter that captures debris particles of 10 microns or less in diameter (e.g., a HEPA filter).

As discussed above, a filter-retaining bulkhead separates the middle section of the housing from the top manifold section and supports the filters in the space surrounded by the sidewall of the inner shell. The filters in a multiple filter unit typically are arranged such that the top ends of the filters pass through or otherwise communicate with passageways in and through the filter retainer.

The housing, particularly middle section in the preferred three-section configuration, communicatively engages at least one inlet that receives debris-laden air from a source of such air (e.g., from a debris body). Typically and preferably, a debris separation-filtration unit of the invention includes a single inlet. The inlet can be positioned in any suitable location. Preferably, the inlet is positioned closer to the top of the housing than the bottom of the housing. More preferably, the inlet preferably is positioned in the top ¼th, top ⅕th, or top ⅙th of the housing. In units having a housing characterized by the preferred three-part housing configuration, the inlet preferably is positioned near the top of the middle portion but below the junction of the middle portion and top portion, such that debris-laden air enters the interior of the housing at a point below the filter-retaining bulkhead. The inlet thus preferably engages the housing at a height above the filters or above at least most of the height of the filters.

The inlet is oriented with respect to the housing such that air entering the housing is tangentially directed with respect to the path from the inlet to the widthwise center of the unit. In other words, the inlet engages the housing such that airflow exiting the inlet and entering the housing is oriented perpendicular to the longitudinal axis of the housing. Alternatively, the unit can include an inlet that directs the air at an angle or curvature that emulates or approaches the curvature of the cylindrical sidewall. The orientation of the inlet, in combination with the shape of the housing and inner shell sidewall, causes a centrifugal airflow to be generated in the centrifugal separation chamber when sufficient airflow passes through the inlet.

The debris separation-filtration unit can engage or comprise any suitable type of inlet. Typically, the inlet includes a channel in which incoming airflow is able to take a shape that fills the entire width of the centrifugal separation chamber, if necessary. Thus, for example, where debris-laden air is transported to the inlet through a round vacuum tube, the inlet can include a straight arm-shaped rectangular duct having a width that is about equal to the width of the centrifugal separation chamber. Such an inlet typically protrudes about 6–12 inches from the exterior of the housing sidewall. Alternatively, the unit can include a nonprotruding inlet channel that includes a straight channel positioned in the interior of the housing. The unit also or alternatively can include a radially oriented inlet channel that has a curvature such that air passing through the inlet channel starts to turn in the direction of the centrifugal airflow before exiting the channel. A radial inlet can better retain airflow energy and reduce wear on the housing and inner shell sidewalls as compared to straight inlets. However, a straight inlet can be more practical where space consideration dictate it.

In operation of the separation and filtration unit, an airflow generator, such as a vacuum-generating positive displacement (PD) blower or vacuum-generating fan; a positive airflow-generating blower or fan; or a combination thereof, generates an airflow that delivers debris-laden air into the inlet at a velocity such the air enters the centrifugal separation chamber thereby forming a centrifugal airflow in the housing. The centrifugal airflow separates debris particles in the airflow on the basis of size, weight, frictional characteristics, or other physical characteristics. Heavier and/or larger debris so separated typically fall out of the centrifugal airflow due to gravity, contact with the interior of the housing sidewall, and/or contact with nonperforated parts of the inner shell sidewall, and thereafter pass through the space between the deflection flange and the surrounding housing sidewall to the bottom debris-collecting portion. Another portion of the centrifugal airflow passes through the airflow passageways and is filtered by the filters. At least a portion of the filtered air thereafter passes into the top portion of the housing and out of the unit by one or more outlets in the top portion.

The presence of the inner shell, lack of a vortex finder, and other features distinguish the centrifugal airflow formed in a separation-filtration unit of the invention from cyclonic airflows used in previously known debris separation systems. In operation, substantially all of the debris-laden air processed by a debris separation-filtration unit of the invention moves in a single flow path; rather than, for example, multiple flow paths typically produced in a cyclonic airflow associated with a vortex finder. The centrifugal airflow further differs from a cyclone in that the centrifugal airflow never changes orientation (i.e., airflow direction) in the housing. In other words, no reverse vortex is formed in any part of the housing. Also, airflow in the unit typically generates only a singular centrifugal airflow as opposed to the multiple cyclones commonly used in previously known debris separation systems. Additional unique and inventive characteristics of the centrifugal airflow produced in the debris separation-filtration units of the invention are described elsewhere herein.

Essentially all of the debris-laden air that contacts the filters passes through the airflow passageways. Most, if not all, of the upwardly-oriented airflow in the housing occurs in the top ½ of the housing and typically upward airflow in the housing is limited to the top of the middle section and the top manifold section. Moreover, upward airflow in the middle portion of housing typically is restricted to the filters and space between the filters. Typically, more air contacts the sides of the filters than contacts the bottoms of the filter in operation of the unit. In general, most of the airflow in the centrifugal separation chamber can be characterized as downward and inward towards the filters.

The invention provides a debris collection, separation, and filtration system that includes at least one debris separation-filtration unit, as described above, in combination with an airflow generating device and at least one debris body. The debris collection, separation, and filtration system can include any suitable type of airflow-generating device that motivates debris-laden air to flow into and through the system such that debris particles are removed from the air by centrifugal separation and filtration. A preferred type of airflow generating device is a vacuum-generating positive displacement (PD) blower. Operation of such a PD blower creates a negative pressure gradient in the system, which motivates the flow of debris-laden air into and through the system. Another suitable, though less preferred, airflow-generating device is a vacuum-generating fan.

The vacuum-generating fan or PD blower is operated at a velocity sufficient for delivering debris-laden air into the system and producing a centrifugal airflow in the housing while preventing debris particles from becoming permanently bound to the filters. Preferably, the vacuum-generating device operates such that the can velocity in the bottom of the filters is about 200 ft./minute or less, the air-to-cloth ratio (the velocity at which air contacts the filters) is about 3.5 ft./minute or less, or, preferably, both. Desirably, the vacuum-generating device is placed downstream of and away from the unit, such that the vacuum-generating device only encounters clean air.

The debris collection, separation, and filtration systems of the invention can include any suitable number of debris separation-filtration units in association with any suitable number of debris bodies. Typical debris collection, separation, and filtration system of the invention include a single debris collection tank or hopper. In a preferred aspect, the invention provides a debris collection, separation, and filtration system that comprises two separation-filtration units of the invention that are configured such that both units can selectively receive debris-laden air in parallel from a single debris body.

A debris body can be any suitable container that receives, collects, and retains debris particles and debris-laden air while allowing such air to travel through the debris body. The debris body can have any suitable size and shape. Preferably, the shape of the debris body is selected such that the debris body can withstand pressure changes to which the debris body is subjected. A cylindrical shaped tank or hopper is preferred. Normally, the invention includes a lengthwise-oriented cylindrical debris body positioned on a frame with one or more associated heightwise-oriented debris separation-filtration units.

Preferably, the debris body has a length that causes a significant proportion of the debris particles in the debris-laden air entering the debris body to settle out of the airflow and be deposited in the bottom of the debris body under typical airflow velocities used in the system. The length of the debris body is normally at least as large, if not significantly larger, than the height of the debris body.

In operation of the system, debris-laden air normally is received near the side of the tank positioned opposite the separation-filtration unit or units and is motivated to pass across the top end of the debris body to one or more debris body outlets, which outlets also are positioned in or near the top end of the tank. The debris body outlets communicate with the inlets of the associated separation-filtration unit or units (usually by way of an intervening debris transport hose, duct, or other passageway). While crossing the top end of the debris body, a portion of the debris in the airflow fall out of the airflow and are deposited the bottom end of the debris body, where the airflow is significantly reduced. The amount of debris so released from the airflow depends on the length of the debris body and other physical considerations (e.g., the volume of the tank). The depth of the debris body usually is such that debris particles collected in the bottom end of the tank are not re-rendered airborne.

A debris separation-filtration unit of the invention preferably is equipped with, or associated with, a system for purging the filters of the unit. Airflow-based purge systems are preferred over mechanical systems that shake or agitate the filters, which the system preferably lacks. An airflow purge system preferably directs a purging airflow to pass through the filters in the direction opposite the direction that debris-laden air contacts the filters (i.e., the purge system creates one or more purging backflows). Such backflow purge systems are advantageous in that the purging airflow is directed from the "clean" side of the filters and, as such, does not introduce additional fugitive debris particles to the filter.

A positive blower; a negative blower; a combination of positive and negative blowers; the result of pressure differences; or any suitable combination thereof can produce a purging airflow or backflow. For example, the unit can include a standard air cannon purge system that delivers multiple blasts of pressurized purging air into and through the filters. Also or alternatively, the unit can be associated with a passive backflow purge system that relies on pressure differences between the debris body and the atmosphere or other body of air under relatively high air pressure. Also or alternatively, the unit can be associated with an active backflow purge system that preferably selectively routes air from the positive side of the blower to the unit to purge the filters. The purge system can operate by a single purging airflow (e.g., where a single large volume backflow of ambient air is used to purge the filters) or multiple purging blasts (e.g., where an air cannon purge system is used).

In a preferred aspect, the unit includes (1) a vacuum-generating fan or negative pressure-generating PD blower as described above; and (2) an ambient air backflow purge system (AABPS) that relies, at least in part, on pressure differences between the atmosphere and a debris body communicatively positioned upstream of the filters (references to positions "upstream" and "downstream" of a point herein and throughout are with reference to the movement of debris-laden air through the system, unless otherwise stated, rather than, e.g., the path of purging air). The AABPS can be engaged by opening one or more selectively openable purge ducts, tubes, hoses, or other passageway-forming structures that allow airflow between the atmosphere high pressure air, the unit, and the debris body upstream of the unit. Because operation of the vacuum creates a negative pressure state in the debris body, ambient air passes through the open purge passageway or passageways, into the top manifold section of the unit, and is pulled through the filters from the clean side of the filters in the direction opposite the direction that the debris-laden air contacts the filters. The vacuum-generating PD blower preferably is disengaged or blocked while the filters are purged. Desirably, the pressure difference between air in the debris body and the atmosphere or other high pressure air is great enough and the volume of the backflow large enough, such that a significant amount of debris particles bound to the filter is released when the AABPS is engaged.

A separation-filtration unit preferably also or alternatively includes or is associated with a positive backflow purge system (PBPS). The PBPS can include one or more tubes, ducts, hoses, or other suitable positive purge passageway-forming structures that deliver clean air from an area downstream of the PD blower (or other vacuum-generating device) to the top manifold section. When the PBPS is engaged (e.g., by the opening of one or more control valves that regulate the flow of air through the positive purge passageway), airflow positively displaced from the blower flows through the positive purge passageway, into the top manifold section through one or more purge inlets, and through the filters causing bound debris to be released from the filter media.

When a desired purge period has elapsed or the pressure differential exhausted, the purge passageway is closed, and the vacuum-generating or other airflow-generating device thereafter operated or unblocked, such that the unit returns to debris separation and filtration mode as opposed to purge mode. The purging of the filter in the unit preferably is regulated by an automated control system and performed without any kind of manual intervention, removal of parts, dismounting, and/or disassembly of the unit.

A separation-filtration unit of the invention also or alternatively can be equipped with a material recovery system, such as a secondary flow debris scavenging system, a collected debris release/dumping system, or a combination thereof. Engaging the debris scavenging and/or debris release system causes debris collected in the bottom portion of the housing to be removed with only a short pause, if any, in the normal operation of the unit. Any suitable debris scavenging, debris release, or other material recovery system that evacuates debris from the bottom portion of the housing such that it does not rise to a level where the debris contacts the filters or becomes airborne due to the centrifugal separation can be used. For example, the unit or units can be individually equipped with one or more dump tubes that permit collected debris to be released from the bottom portion at the associated unit when the units are raised to an angle at which the collected debris particles are gravitationally released. An example of such a system is described elsewhere herein.

Debris separation-filtration units including a pneumatic debris scavenging system are preferred. Such a system typically includes a selectively openable debris scavenging passageway that selectively permits transport of collected debris from the debris-collecting portion of the housing to an associated debris body when a sufficient airflow contacts the collected debris. The operation of the debris scavenging system can be facilitated or assisted by an air fluidizer or other mechanical device positioned in the bottom of the collection area, but often the purging airflow generated by operation of the air cannon, AABPS, PBPS, or other purge system is sufficient to move the collected debris from the unit to the debris body.

Also or alternatively, a debris separation-filtration unit can include a mechanical air gate-associated material recovery system. Any suitable type of air gate that selectively mechanically induces debris to enter a material recovery passageway can be used to remove debris from the unit. An air gate can, for example, be in the form of a rotating drum or similar rotational device comprising a number of fins, paddles, or similar structure that move pockets of debris into the material recovery passageway when the system is activated and such debris are engaged by the structure. In resting position, the fin, paddle, or similar structure blocks the entry to the material recovery passageway allowing debris to collect in the bottom of the associated housing. When engaged, the drum mechanically rotates and the fins, paddles, or other structure captures pockets of debris in the bottom of the associated housing. At the point where the fins pass the material recovery passageway, an associated pocket of debris particles is released and deposited into the material recovery passageway. In an alternative aspect, the air gate can comprise an auger-like structure, which rotates to deliver debris in the bottom portion of the housing into the material recovery passageway. A vacuum system, positive blower, or mechanical debris transport system can further assist the transport of debris to the debris body through the material recovery passageway(s).

In yet another aspect, a unit or system of the invention can include a jet pump or similar device, such as an air ejector, as a material recovery system in place of or in addition to any of the other material recovery systems described herein. The basic design and principles of operation of such devices are known. In one exemplary aspect, an air ejector, which is a jet pump that uses air at atmospheric or near atmospheric temperatures as operating media is used to remove collected debris in the collection cone. A typical air ejector includes a tube, duct, or other passageway, placed adjacent to an outlet in the collection cone. Alternatively, such an ejection passageway communicates with the collection cone by a transverse passageway, located at an angle (or being perpendicular to) the path of airflow through the ejection tube. An airflow-generating device, such as a positive displacement blower, located in or in association with the air ejection passageway, is operated such that high velocity airflow is produced in the passageway in the direction of a debris body. The airflow creates a negative pressure at the outlet of the collection cone, such that collected debris are drawn/motivated into the ejection passageway or another associated passageway located near the ejection passageway (in the path of the airflow motivated by the negative pressure gradient generated by the high velocity airflow), and thereafter transported into a debris body. The air ejector itself includes no moveable parts other than the airflow-generating device. In other aspects, the airflow-generating device can be replaced with re-routed airflow from another component of the system or unit, or compressed air can be used. In even further aspects, liquid eductor/jet pumps can be used. Other variations include the use of venturi eductors and steam ejectors for similar purposes.

The invention also provides a debris separation and filtration system including two or more combined debris separation-filtration units of the invention. Such a multiple unit system can include any suitable number of debris separation-filtration units in any suitable functional arrangement. A system comprising two units, which can be referred to as a dual centrifugal separator-filtration system, is preferred. In a preferred dual centrifugal separation-filtration system, the two units can selectively operate in a parallel and coordinated fashion, each unit receiving a portion of a debris-laden airflow from an upstream location (usually an associated debris body). Multiple unit systems allow one of the units of the system to be taken off line (e.g., by blocking the flow of debris-laden air into the unit, blocking the vacuum force or other airflow-generating force from inducing such airflow and permitting the unit to operate, or both); operate in a purge mode for a period of time; operate in a material recovery mode where debris particles in the bottom portion of the units are removed; or any suitable combination thereof (individually or in combination), while the other unit or units remain in debris separation-filtration mode. The multiple-unit systems of the invention can be part of a debris collection, separation, and filtration system that also includes a suitable airflow-generating device and one or more debris bodies, as described above.

The invention also provides a debris collection, separation, and filtration system that includes one or more debris bodies; an airflow generating device, first and second debris separation-filtration units, each unit associated with a selectively operable backflow purge system; and an automatic detection-control system that regulates whether the separation-filtration units are in purge mode or filtration-separation mode A detection system can include or consist of any suitable device or combination of detection devices that detect the passage of a set period of time, sense the occurrence of an event, detect the presence of a set physical condition, or determine whether any combination thereof (individually and/or collectively) has occurred or is occurring. The detection system or components of the detection system send a signal or signals to the control system or components thereof, and the control system or portions of the control system receiving such signal or signals respond by making changes necessary to change the mode of operation of one or more unit(s) in the system. Thus, a signal from a detector will cause the control system or control system component to cause a unit to change from debris separation-filtration mode to filter purge mode, offline mode, or material recovery mode.

Detectors known in the art can evaluate a number of other suitable parameters and such detectors can readily be adapted for use in the system/units of the invention. For example, a detector can measure airflow pressure across filters and send a signal when a pressure indicative of an undesirable level of debris particle build-up is reached such that the associated filter is purged. Also or alternatively, the system can include a detector that causes a unit to enter material recovery mode when the height or weight of collected debris in the unit reaches an undesirable level. Other suitable detectors include light detectors, such as a photomultiplier particle counter, photometer, light scattering detector, or light contrast detector used in combination with a light-emitting device. Airflow velocity detectors or pressure detectors (e.g., pilot tubes) also can be useful detectors. One preferred type of detector is an ultrasonic particle detector. The ultrasonic detector emits one or more ultrasonic beams in the desired monitoring area or areas. The detector determines whether the ultrasonic beams contact debris particles in the monitored area and thereby determines whether debris have accumulated to an undesirable level and/or are present in an undesirable concentration. Another type of preferred detector is a capacitance detector, examples of which are known in the art.

The detector or detectors can be located in any suitable part of the debris collection, separation, and filtration system. Preferably, the system includes at least one detector in the debris body and/or in the bottom debris-collecting portions of the debris separation-filtration units. The detectors in these locations preferably assess the level of accumulated debris. When an undesirable level of debris particles accumulates in a unit, the associated detector sends a signal to the control system that causes the unit to enter a material recovery mode and, optionally and preferably, filter purge mode (simultaneously). In the case of a detector in the debris body, when the level of debris reaches too high of a level the system typically shuts off by stopping operation of the associated airflow-generating device.

Selectively controllable passageways that respond to signals from the detector typically connect the components of a debris collection, separation, and filtration system. For example, in a dual centrifugal separation-filtration system that includes a vacuum-generating PD blower, the system typically includes first and second vacuum passageways that, individually, selectively permit or prevent airflow between the vacuum-generating blower and the unit the particular passageway is associated with in response to signals from the detector(s). Such a system also typically includes first and second backflow passageways or purge passageways, which first and second backflow passageways selectively permit airflow between the first and second debris-filtration units, respectively, and a source of purging air (e.g., the atmosphere in an AABPS and/or the downstream side of the PD blower in the case of a PBPS) in response to signals from the detector(s). In operation of such a system, the vacuum-generating PD blower motivates the flow of air through any open vacuum passageways from the units and thereby motivates debris-laden air to enter and flow through the units while generating a negative pressure state throughout portions of the system upstream of the PD blower. Upon receipt of a signal from the detector, the control system (a) closes the first pressure passageway and opens the first backflow passageway or (b) closes the second pressure passage and, opens the second backflow passageway, (a) or (b) occurring until a set period of time has passed, the signal ceases, the pressure differential of the AABPS is depleted, or any suitable combination thereof occurs, such that a portion of the debris bound to the purged filter are released. While the one unit of the system is in purge mode, the other unit remains in debris separation and filtration mode.

Such a dual centrifugal separation-filtration system also preferably includes first and second debris scavenging passageways that open in response to either the application of airflow to the collected debris and/or to signals from a detector. One end of each of such debris scavenging passageways communicatively engages the bottom portion of an associated unit, and the other end of each passageway engages the debris body, such that collected debris can be transferred from the associated unit to the debris body when an airflow is applied to the collected debris and the debris scavenging passageway associated with the unit is open. Preferably, the debris scavenging system operates in coordination with the operation of a backflow purge system, as described above, such that upon receipt of a signal from a detector (i) a backflow purges the filters in the first unit and moves collected debris from the bottom portion of the first unit through the debris scavenging pathway to the debris body; or (ii) a backflow purges the filters in the second unit and moves collected debris from the bottom portion of the second unit through the second debris scavenging passageway to the debris body; such that at least a portion of the debris collected in the bottom end of the housing in the first or second unit is removed, while the other unit continues to separate and filter debris-laden air.

Any suitable type of automatic control system (ACS) can be used to control the movement of air through the passageways of the system. For example, where the system includes a number of passageways that connect the components of the system the control system can include a number of control valves that govern airflow through the passageways and thereby regulate the operational mode of the system's separation-filtration units. Typically, the ACS includes or consists of a number of control valves that regulate airflow through such passageways and thereby govern the operation of the associated debris separation-filtration units. Thus, for example, the control system can include first and second vacuum passageway control valves, which, respectively, close or open the first and second vacuum passageways, in response to a signal from the detector.

An ACS can include any suitable type of control valves, several examples of which are known in the art. Desirably, an ACS comprises a number of high recovery positive control valves. Rotary motion (e.g., ball, plug, or butterfly closure), high recovery, and compact control valves are preferred control valves. Particularly preferred are butterfly control valves. Butterfly control valves can be either wafer-style or lug-style butterfly valves, as desired. The orientation of the butterfly valves can be swing through, lined, or eccentric, also as desired. Suitable butterfly valves can be formed from any suitable materials, such as, e.g., a flexible and durable plastic, and are commercially available from a number of sources.

The design and operation of butterfly and other rotational, high recovery control valves is understood in the art. Briefly, such a control valve comprises a pneumatically controlled circular or other type of gate that rotates (usually 90°) to open or close (alternatively, a sliding gate or other positive seal can be use in other types of valves). The closure of the gate positively prevents air from going through the passageway associated with the valve. An air cylinder actuator typically and preferably powers the rotation of the cylinder. A pneumatic solenoid intermediate valve associated a circuit that receives signals from the detector(s) pneumatically actuates the opening and closing of the control valve.

In a typical dual centrifugal separation-filtration system, such high recovery, rotational control valves typically control the flow of air through the vacuum passageway(s) and the purge passageway(s). Other passageways in such a system (e.g., the debris scavenging pathway and the debris transport pathway) can be associated with check valves, rather than such positive motion/gated control valves. Any suitable type of check valve can be used for the other passageways. Wafer-style check valves are preferred. The design and operation of such valves, and similar check valves, is known in the art. In general, wafer check valves comprise a flipping gate that reacts to airflow such that the valve permits airflow through the associated passageway in one direction while blocking it in the opposite direction.

A multiple control valve ACS typically is configured such that in the failsafe state (or default state) the units of the system are in separation-filtration mode. As such, in the failsafe state, the control valves in the vacuum passageways are open (i.e., have a fail open state), the valves controlling flow through the purge passageways are closed (i.e., have a fail-in-place-state), the valves controlling flow through the debris scavenging pathways (if the system includes a debris scavenging system) are closed, and the valves controlling flow from the debris body to the units (if such valves exist) are open.

Where the system comprises a debris scavenging system, the system also preferably includes one or more debris scavenging passageways (that preferably are selectively operated by an associated control valve or other control system). In a typical dual centrifugal separation-filtration system comprising a single associated debris body, the end of the debris scavenging passageway that deposits debris in the debris body desirably extends a distance into the debris body to a point below the level at which debris-laden air flows across the top of the tank. In such a configuration, one of the units of the system can be in debris scavenging mode while the other unit continues to receive debris-laden air from the debris body, without permitting scavenged debris to enter airflow directed to the other unit in separation-filtration mode. The outlet port or ports (where the airflow across the tank is released from the tank to the unit or units) also or alternatively can be positioned significantly closer to the area where the tank receives debris-laden air from the collection device than the area where the debris scavenging passageway deposits debris, such that the scavenged debris does not contact the airflow passing into the outlet port or ports.

The invention also provides debris collection vehicles comprising any one of the above-described filtration and separation units or systems. Thus, for example, the invention provides a debris collection vehicle comprising a frame, which frame is supported, directly or indirectly, by a number of wheels, and supports an airflow generating-device, a debris body, and at least one combined separation-filtration unit of the invention. In a more particular aspect, the invention provides a self-propelled debris collection vehicle comprising a selectively tiltable and/or liftable frame supported, directly or indirectly, by a number of wheels, which frame supports a collection system that gathers debris from one or more target areas (e.g., a surface, an area of debris-contaminated air, or both), a debris collection tank, an airflow-generating device, and a dual centrifugal separation-filtration system. Typically, the debris body and unit or units are mounted on a tiltable/liftable frame, such that the tank and/or unit(s) can be opened and rapidly emptied when full or when the vehicle is not in use. In such vehicles, the support frame typically is mounted on a main vehicle frame.

In another aspect, the invention provides a satellite trailer comprising one or more debris separation-filtration units of the invention. Such a satellite trailer can include any or all the features of a vacuum truck or other self-propelled vehicle as described elsewhere herein with the exception that the trailer lacks a dedicated tractor system. For example, the invention provides a satellite trailer that includes a debris body, an airflow-generating device, a dual centrifugal separation-filtration system, and a dedicated hydraulic system that enables offload dumping of the unit, units, and/or an associated debris body.

In still other aspects, a debris collection, separation, and filtration system of the invention or one or more separation-filtration units of the invention can be used as or as part of a stationary debris collection system. For example, a system of the invention can be used to collect, separate, and filter debris in a coal power plant or steel mill as a stationary debris separation-filtration system.

There is very little upward airflow in the bottom portion of the housing in the units of the invention. A can velocity of less than about 200 ft/min, less than about 150 ft/min, less than about 100 ft/min, or even less (e.g., about 50 ft/min or less) in the bottom portion of a separation-filtration unit of the invention is typical during debris separation and filtration. Due to the low can velocity in the bottom portion of the debris separation-filtration device, collected debris particles in the bottom portion usually do not contact or re-contact the filter The airflow-generating device of the system typically is operated such that the air-to-cloth ratio is less than about 3.5 ft./min. More preferably, the airflow-generating device of the system is operated such that the air-to-cloth ratio is less than about 3 ft/min, less than about 2.5 ft./min, or less than about 2 ft./min.

Filters in the debris separation and filtration units of the invention have a significantly longer life than in other systems. For example, a system comprising a debris body having a 12–16 cubic yard volume in association with a unit comprising about 30 standard sock filters can operate until the debris body reaches capacity without any significant plugging of the filters. In contrast, a system comprising a separate cyclone or centrifugal separator and baghouse filter, operated serially, can fill only about 25% of a similar debris body before the filters become too clogged for further operation without filter replacement. In other words, a typical debris separation-filtration unit of the invention is least about 2× more efficient, at least about 3× more efficient, or even at least about 4× more efficient than a separated serial cyclone/centrifugal separator and debris filter system.

The invention further provides methods of filtering and separating debris. In general, the invention provides a method of debris separation and filtration that includes subjecting debris-laden air to centrifugal separation and filtration using any one of the above-described debris separation-filtration units or system.

In another sense, the invention provides a method of filtering and collecting debris that includes generating an airflow that delivers debris-laden air tangentially into a cylindrical container to form a centrifugal airflow therein, contacting the centrifugal airflow with a perforated inner shell, allowing a portion of the airflow to pass through the inner shell, and filtering the portion with a debris-capturing filter. Thereafter, the resulting filtered air is released from the unit. Forming the centrifugal airflow and blocking a portion of the debris in the airflow entering the system from directly contacting the filter increases the effective life of the filter.

The above-described method can be further characterized in including the step of taking the unit offline (stopping the vacuum or blocking its suction force such that the can velocity and air-to-cloth ratio in the unit in the system are at about 0, such that the resistance to debris being released from the filter and gravitationally falling to the bottom of the unit is substantially reduced) and, preferably, purging the filter with an a backflow of air while the unit is in such an offline state. Such a method can additionally include a material recovery step, which can comprise, for example, transmitting debris particles from a purged separation-filtration unit to a debris body by way of contacting the collected debris particles in the unit with the purging backflow, desirably after the filter or filters of the unit are purged. Where the method is performed with a system comprising multiple units, the method can be characterized in that one of the units is taken offline for a limited period of time and optionally purged by a backflow while the other unit or units continues to receive debris-laden air and separate and filter such air.

Another exemplary method of separating and filtering debris particles provided by the invention includes providing a debris collection vehicle comprising first and second debris separation and filtration units of the invention, each unit comprising or being associated with a detector and an ACS; producing an airflow that causes debris-laden air to be delivered the first and/or second units, wherein the unit or units receiving such debris-laden air subject such debris-laden air to centrifugal separation and filtration; and detecting whether (i) the presence of a physical condition exists, (ii) a period of time has passed, or (iii) a combination thereof has occurred or is occurring in one of both units. Upon the occurrence of the event, passage of the period, or occurrence of the combination (individually and/or collectively), the detector generates a signal, such as an electric or mechanical signal, that is transmitted to an automated control system. The ACS either (a) blocks the flow of debris-laden air into and through the first unit and causes a backflow of air to purge the filter in the first unit or (b) automatically blocks the flow of debris-laden air into and through the second unit and causes a backflow of air to purge the filter in the second unit. In the method, one unit continues to receive, separate, and filter debris-laden air while the filter of the other unit is purged. The exemplary method can be further characterized in comprising a step of scavenging debris collected in the first unit when the first unit filter is purged and scavenging debris collected in the second unit when the second unit filter is purged, such a debris scavenging step comprising transmitting debris particles from the bottom portion of the unit comprising the purged filter to the debris body.

In order to further explain the invention, representative embodiments of the separation-filtration units, associated systems, and debris collection vehicles of the invention will be described with reference to the accompanying figures. It will be understood that the provided description of such representative units, systems, vehicles, and operation of such representative units and systems is intended merely to further illuminate the invention rather than limit its scope. An ordinarily skilled artisan, given the preceding general description of the invention, will recognize several alternative variations of the representative embodiments described in the following paragraphs and shown in the accompanying figures can be designed and employed in accordance with the invention.

A representative combined debris separation and filtration unit of the invention is shown in FIG. 1. A housing 10 forms the exterior of the unit 1. The housing includes a funnel-shaped collection cone bottom section 40; a top manifold section 20 (see, e.g., FIG. 2), the top end of which is enclosed by a lid 22; and a cylindrical sidewall 30, which cylindrical sidewall 30 defines a middle section 35 (see, e.g., FIG. 2). The housing 10 of the preferred unit depicted in FIG. 1 is formed from steel and the thickness of the sidewall is about 3/16th inch throughout. The housing is about 48–50 inches in diameter throughout the middle section 35 and top section 20. The height of the middle portion sidewall 30, between the top and bottom flanges, is about 68–72 inches. As shown in the cutaway section of FIG. 1, the middle portion sidewall 30 surrounds the sides of an inner shell 60, which inner shell 60 in turn surrounds the sides of a bank of sock filters 70, which filters are about 68–70 inches in height, about 6 inches (individually) in diameter, and can capture debris particles of about 5–10 microns diameter or larger.

The funnel-shaped collection cone 40 is fused to the bottom of the cylindrical sidewall 30 at bottom flange 44. The interior of the collection cone 40 and the interior of the middle portion 35 are in direct communication, such that debris falling through the center interior of the middle portion 35 directly pass into the collection cone 40. At the bottom center of the collection cone 40 is a disc-shaped scavenging tube flange 42, which is bolted, welded, or otherwise sealing bound to a debris-scavenging passageway-forming tube or duct, usually by way of a U-shaped or L-shaped outlet member.

The dimensions of the collection cone 40 are selected such that the debris particles peeled off from the centrifugal airflow and/or released from the filters 70 during purging are collected therein without contacting or re-contacting the filters 70. The collection cone is about 30 inches deep at its center. The internal side of the conical collection cone sidewall normally has a smoothness and composition such that debris particles readily slide to the bottommost available part of the cone. The slope of the conical collection cone sidewall also generally is characterized by an about 30° included angle (side-to-side). An upper section having a height of about 36–40 inches preferably separates the middle portion of the housing from the reduced-diameter collection cone. The inventors have found that a conical collection cone having such dimensions provides advantageous debris collecting capabilities over other designs.

Positioned above the collection cone 40 is the middle section of the housing 35. The cylindrical shape of the sidewall 30 that defines this section facilitates, induces, and/or otherwise promotes the formation and/or maintenance of a centrifugal airflow when the unit is engaged in debris separation and filtration. The sidewall 30 retains a smooth cylindrical shape throughout the middle portion 35, such that the radius from any portion of the sidewall 30 to the widthwise center of the housing 10 is substantially constant at about 25 inches. The height of the middle portion sidewall 30 in the representative unit 1 is about 68–72 inches. The height of the entire representative separation-filtration unit 1 is about 130 inches.

Figure 2:
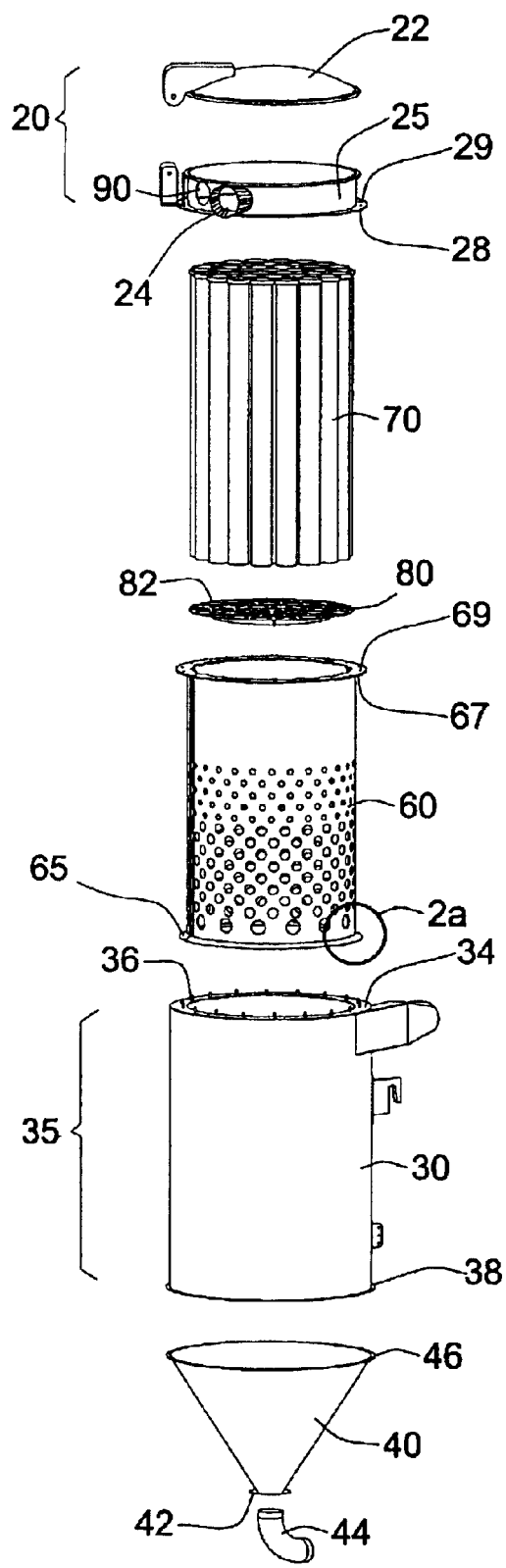
FIG. 2 is an exploded view of the representative combined debris separation-filtration unit shown in FIG. 1.
Figure 4:
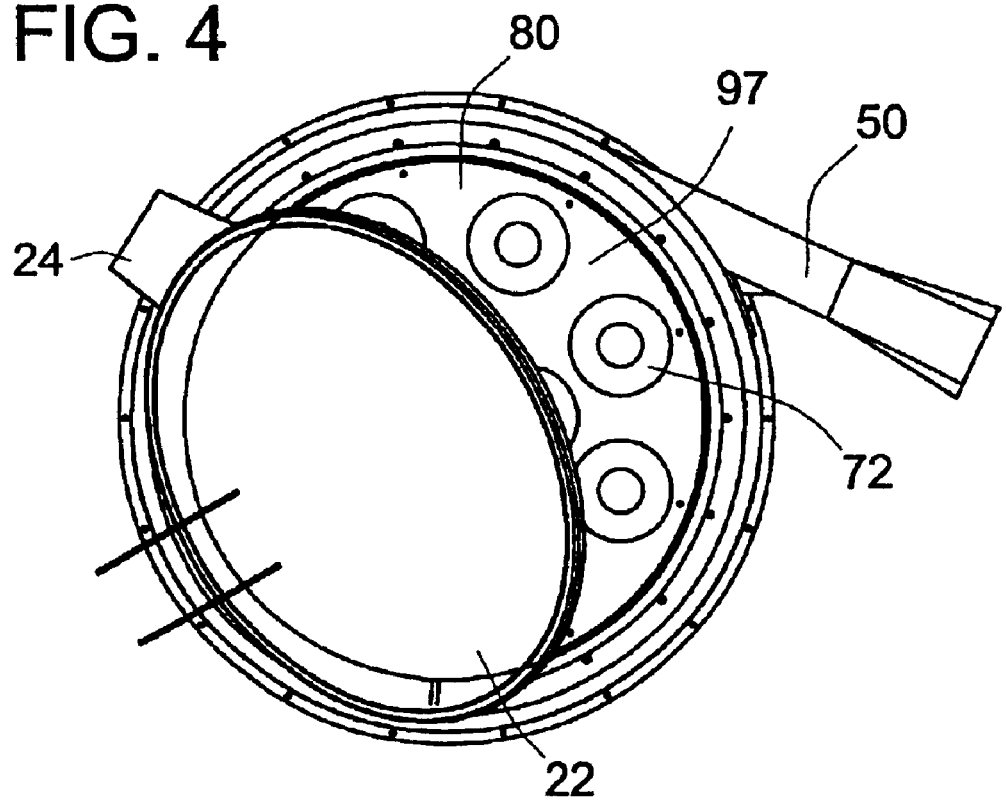
FIG. 4 provides a top view of the exemplary debris separation-filtration unit comprising a number of cartridge filters.

At top flange 28, the middle section sidewall 30 engages the top manifold section sidewall 20 and a tube plate filter-retaining bulkhead 80. The tube plate 80 partially separates the interior of the top manifold section of the housing 20 from the interior of the middle section and retains the tops of the sock filters 72 in the interior of the bottom manifold section (see also FIG. 4). About 30 sock filters 70 are suspended from the tube plate 80 in the interior space surrounded by the inner shell sidewall. As can be seen in FIG. 2, the tube plate 80 comprises a number of filter exhaust passageways 82, through which the bodies of the sock filters 70 pass through, and above which the tops of the sock filters 72 are retained. The passageways 82 are spaced apart, such that spaces 97 are formed between the filters (see, e.g., FIG. 4).

The top manifold section of the housing 20, which is defined by the sidewall of the housing above the top flange 28 (25—see, e.g., FIG. 2), is about 10 inches tall. The circumference and diameter of the top manifold section 20 are substantially equal to the circumference and diameter of the middle portion of the housing 30. Other than the tops of the filters 72, the interior of the top section is vacant.

As shown in FIG. 1, the top end of the top manifold section 20 is accessible by way of a lid 22 that opens and closes by a standard, two-part hinge system 26. When the lid 22 is in the open position, the interior of the top manifold section 20 and the tube plate 80 are exposed (see, e.g., FIG. 4). This open end of the housing 10 permits quick access to the interior components. When the lid 22 is closed, it forms an airtight seal with the top manifold section sidewall 25.

The top manifold section 20 engages a tubular vacuum outlet 24 at a point about 90–180 circumferential degrees (or slightly more than about 180°) from where the housing engages the inlet (see, e.g., FIG. 1). Height-wise, the vacuum outlet 24 is positioned such that its interior is at or above the height of the tops of the filters 72. In use, the vacuum outlet 24 communicatively engages a vacuum hose, duct, tube, or other passageway, that draws filtered air from the interior of top manifold section to a vacuum-generating blower assembly such that debris-laden air is motivated to enter and be processed by the unit. The top manifold section 20 also engages a purge inlet 90 that permits communication between a purge passageway and the top manifold section 20.

In the cutaway portion of the unit 1 depicted in FIG. 1 the inner shell 60 and assembly of sock filters 70 are shown. The sides of the housing 10, inner shell 60, and sock filter assembly 70 are in a concentric relationship. The middle section sidewall 30, inner shell 60, and filter assembly 70 all have an essentially circular cross section and each have an essentially uniform longitudinal diameter.

The inner shell 60 comprises a perforated cylindrical tube or sleeve formed from ⅛th-3/16th inch thick steel that has a number of circular airflow passageways 62 formed therein. The airflow passageways 62 have diameters of about 1.5–4 inches (smaller diameter passageways are at the topmost perforated portion of the shell sidewall and larger diameter passageways are at the bottommost perforated portion). The inner shell 60 is substantially as tall as the middle portion sidewall 30 (i.e., about 68–72 inches tall). The diameter of the inner shell 60 is about 40–42 inches throughout.

Almost the entire exterior side of the inner shell sidewall 60 and the interior side of the middle portion sidewall 30 are spaced about 4 inches apart, thereby forming a centrifugal separation chamber. The only contact between the inner shell 60 and the housing is where the top flange of the inner shell 67 engages the bottom side of the top lip or top flange 34 of the housing.

Figure 2A:
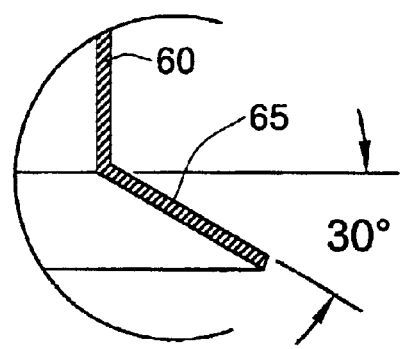
FIG. 2a provides a magnified view of a debris deflection flange component of the representative debris separation-filtration unit.

A deflection flange 65 protrudes about 3.5 inches outward towards the interior side of the middle portion sidewall 30 from the bottom exterior end of the inner shell 60. Accordingly, this deflection flange-restricted space between the interior of the middle portion sidewall 30 and the exterior edge of the deflection flange 65 is about ½ inch wide. The deflection flange 65 is slightly downwardly sloped and has a smooth top edge so that debris particles that contact the top edge slide off the flange to the restricted space. Preferably, the deflection flange 65 is characterized as forming an angle of about 30° with the sides of the inner shell sidewall due to this downward sloping orientation (see FIG. 2a). The sidewall of the middle portion 30 and the sidewall of the inner shell 60 do not contact one another below the top flange 28. The top of the centrifugal separation chamber ends at the top flange 28, where the top of the inner shell, top of the middle portion, tube plate, and bottom end of the top portion, are welded, bolted, or otherwise bound.

Figure 3:
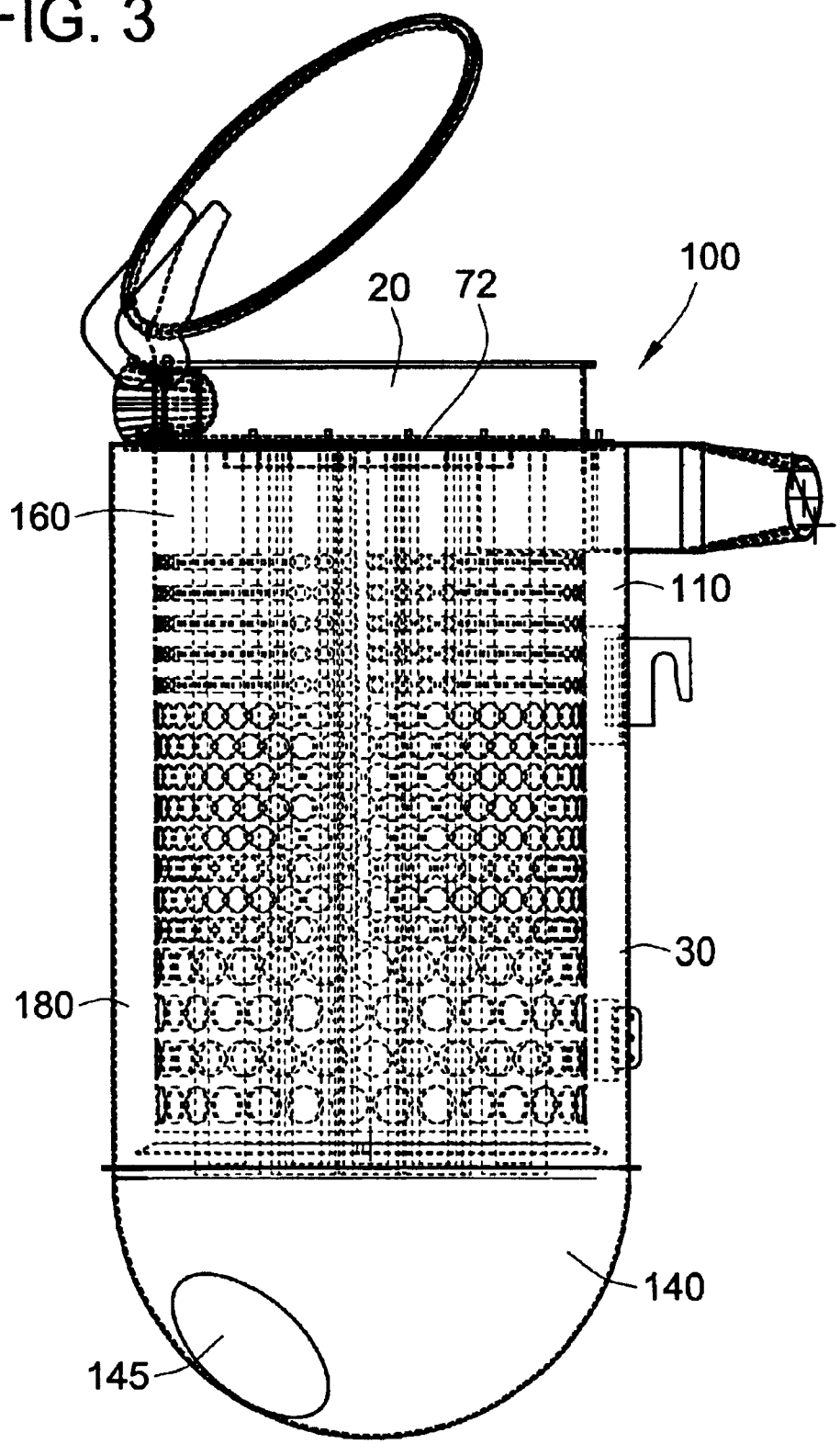
FIG. 3 is a side cutaway view of an alternative exemplary debris separation-filtration unit of the invention.

As shown in FIG. 1, the inner shell 60 preferably comprises an uneven distribution of airflow passageways. Specifically, the topmost perforated portion of the inner shell 64 has significantly less airflow passageways and airflow passageways of smaller diameter than the middle portion 66 of the inner shell. The airflow passageways in the bottom portion 68 are, in turn, significantly larger than the airflow passageways in the middle portion 66. Due to these differences in the number and size of the passageways, there is more open area in the bottom portion 68 than in the middle portion 66 of the inner shell, and more open area in the middle portion 68 than in the top perforated portion 64. Due to this arrangement of airflow passageways and distribution of open area, at least as much air (if not more) passes through the bottom open area of the inner shell 60 than through the top open area of the inner shell. Specifically, about 60% of the bottom perforated section of the inner shell sidewall is open to airflow and about 20% of the topmost perforated portion is open to airflow. Another inner shell 160 having a similar gradient of open area throughout its perforated portion, but a different pattern in airflow passageways is shown in FIG. 3.

The topmost end of the inner shell sidewall 63 has no airflow passageways. The lack of airflow passageways in the top end of the inner shell sidewall 63 facilitates the formation of the centrifugal airflow and protects the filter by forcing the debris-laden air to circumferentially travel at least one rotation around the inner shell before passing through an airflow passageway.

The inner shell sidewall 60 surrounds the sides of a bank of about 30 circularly arranged sock filters 70, which filters are able to capture debris particles of about 5–10 microns or larger. The exterior side of the outermost filters in the bank typically is about 1 inch from the interior side of the inner shell sidewall. The individual sock filters 70 are spaced apart from one another, such that air is able to flow between the filters and contact the media along the full length of the filters.

Positioned on one side of the middle section sidewall 30, near the top flange 28 is the inlet 50. The inlet 50 consists of a straight duct, which protrudes about 20–30 inches, and preferably about 24 inches, outward from the top end of the middle portion sidewall 30. The inlet 50 contains a rectangular airflow passageway 53 that passes through the sidewall 30 and thereby communicates with the centrifugal separation chamber at the top end of the middle section 35. The tangential orientation of the inlet 50 causes airflow entering the housing 10 through the inlet 50 to move along the interior of the sidewall 30, rather than in a direct path to the center of the system 1, and thereby causes a centrifugal airflow to form in the centrifugal separation chamber. The rectangular inlet channel 53 has a width of about 4 inches, which width is equivalent to the width of the centrifugal separation chamber. The height of the rectangular inlet channel 53 is substantially greater than the width of the channel. The inlet 50 typically engages an about 8-inch diameter round vacuum hose on its exterior receiving end 52. The shape of the incoming airflow is changed from round to rectangular in the inlet channel before entering the centrifugal separation chamber. The receiving end 52 can be in the form of a tapered transition section between a round tube-engaging interface and the rectangular channel portion 53 of the inlet 50.

Figure 5:
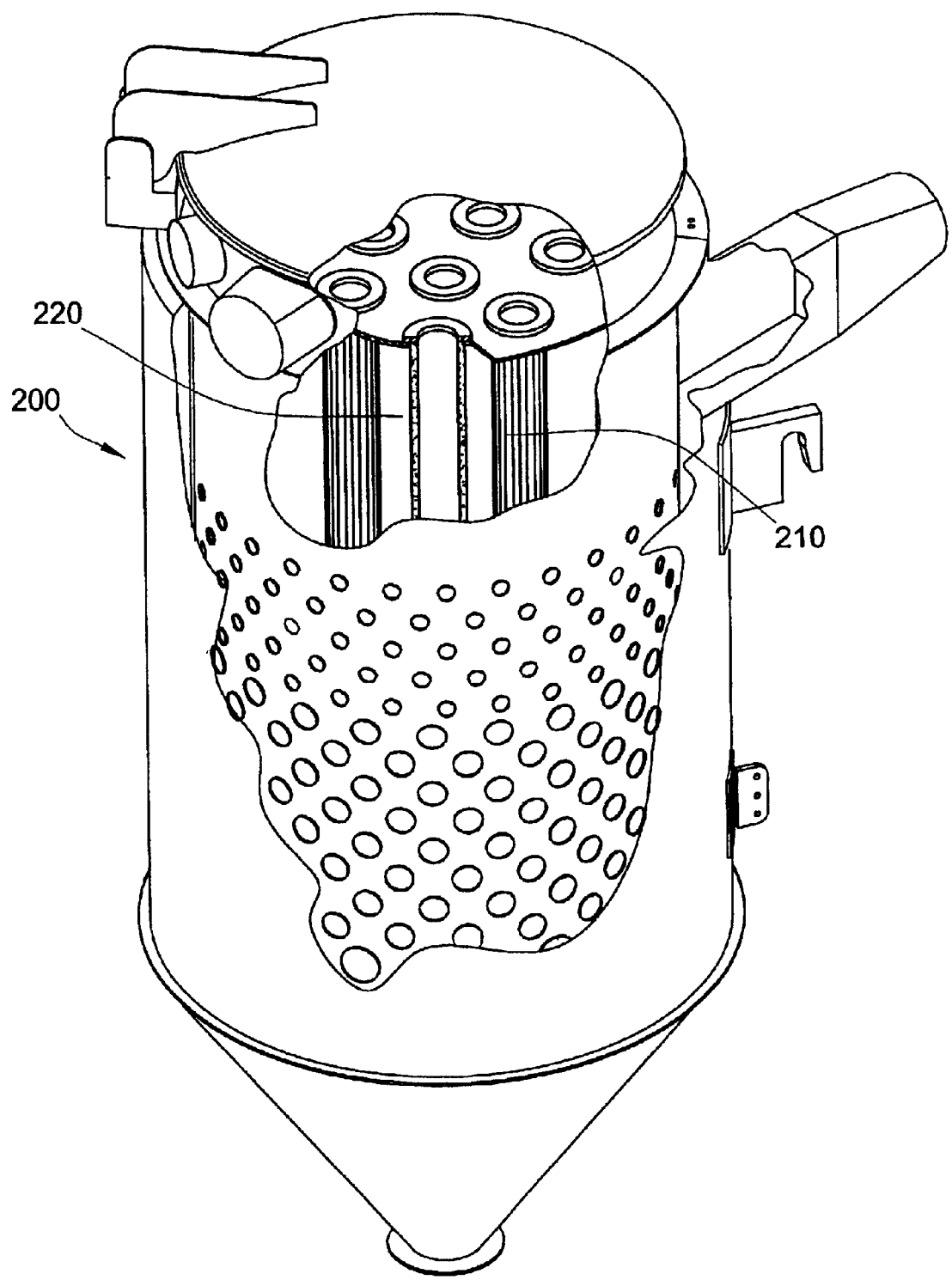
FIG. 5 is a cutaway view of another representative separation-filtration unit of the invention, which unit is equipped with a cartridge filter system similar to the unit depicted in FIG. 4.

As shown in FIG. 5, in another preferred aspect of the invention a filtration-separation unit 200 comprising a cartridge filter system is provided. Usually about 12 of such cartridge filters 210 are contained in the area surrounded by the inner shell. Though the unit has less than ½ the number of filters contained in the above-described sock filter assembly, it provides about 15% more filter surface area due to the pleating of the cartridge filter media. Similar to in a sock filter system, the cartridge filters preferably are separated by spaces 220, which space allow debris-laden air passing through the airflow passageways to contact the filters more evenly than would otherwise be the case.

An exploded view of a representative separation and filtration unit, depicted in FIG. 2, illustrates the interrelationship of typical components of a debris separation-filtration unit. A debris-scavenging outlet 46 can be bolted, welded, or otherwise sealed to the debris scavenging flange 42 and assist the unit in engaging a debris-scavenging vacuum tube. The collection cone 40 comprises an upper lip or flange 45 that is welded, bolted, or otherwise sealingly and stably bonded to the bottom lip or flange 38 of the middle section sidewall 30, thereby forming the bottom flange 44. At the bottom flange 44, the diameter of the housing 30 is equal to (or at least about equal to) the diameter of the collection cone 40.

The middle portion sidewall 30 also comprises an upper lip or flange 34 from which a number of connecting bolts 36 protrude upward. In assembly of the debris separation-filtration unit, the connecting bolts 36 pass through boltholes 29 located in the lower lip 24 of the top manifold section 20, thereby securing these components by bolting. The tube plate 80 is mated to and maintained between these portions of these elements, such that an integral seal is formed between the elements at the top flange 28. The inner shell 60 is bound the lower end of the middle portion lip 34 by similar bolting through bolt holes 69 located in the top flange of the inner shell 67.

The representative filtration-separation unit 1, shown in and described above with reference to FIGS. 1 and 2, is capable of being readily connected to and removed from a debris collection vehicle, as will be described in further detail below. Positioning hook and bracket, 32 and 33, located on the exterior side of the sidewall 30, facilitate the positioning of the unit 1 on a suitable mounting.

FIG. 3 provides a side cutaway view of another exemplary debris separation-filtration unit of the invention 100, the primary difference in the unit 100 depicted in FIG. 3 from the unit 1 shown in FIG. 1 being that the housing 110 comprises a semi-hemispherical bottom debris-collecting portion 140. The semi-hemispherical bottom portion can include an inspection/access hole 145 that permits an operator to observe the level of debris in the bottom portion 140 and/or perform offline cleaning of the bottom portion (e.g., manual chipping of dried fly ash build up—in aspects where the hole 145 is/acts as a selectively openable port). Debris separation-filtration units having such a housing are often used with a dump tube material release system (see, e.g., FIG. 12).

As in the representative unit shown in FIGS. 1 and 2, the exterior side of the inner shell 60 and interior side of the sidewall 30 of the exemplary unit depicted in FIG. 3 are spaced apart from one another to form a centrifugal separation chamber 180.

Figure 6:
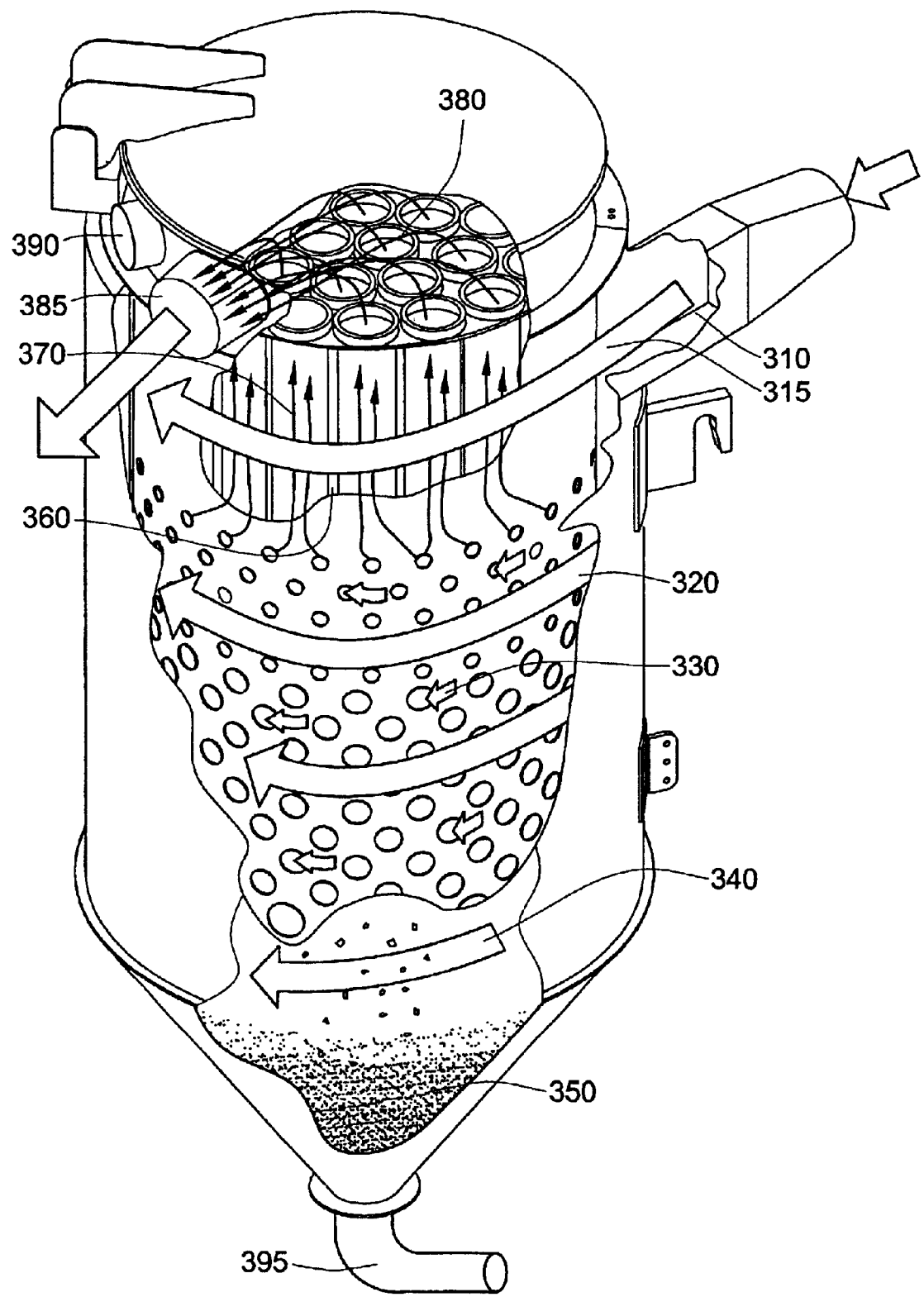
FIG. 6 depicts the path of debris-laden air and debris through the representative unit of the invention shown in FIG. 1, during centrifugal separation and filtration of a debris-laden airflow.

The flow of air in and through a representative separation-filtration unit of the invention during debris separation and filtration is shown in FIG. 6. In operation of the unit, an airflow generator (e.g., a vacuum-generating PD blower) produces a negative pressure gradient, such that a vacuum is created, which vacuum delivers debris-laden air into and through the unit. As described elsewhere herein, a positive airflow system or a combination of positive and negative airflow can alternatively be used to move the debris-laden air into, through, and out of the unit.

As shown in FIG. 6, he straight protruding inlet receives debris-laden air 310 and tangentially delivers such air into the centrifugal separation chamber 315. This tangential orientation of the inlet, in combination with the curvature of the middle portion sidewall and inner shell, causes a centrifugal airflow to form 320 in the centrifugal separation chamber. The centrifugal airflow typically is generated without the use of any moving mechanical parts in the centrifugal separation chamber. Screens or barriers do not divide the centrifugal separation chamber, and, as such, only a single centrifugal separation typically is created. The centrifugal airflow travels around the inner shell, progressively sloping downward towards the bottom portion of the housing as portions of the air flow pass through the airflow passageways. Heavier and/or larger debris particles typically fall out of the centrifugal separation through the space between the deflection flange 65 and the interior of the adjacent sidewall 340, and are deposited in the bottom of the collection cone 350.

At various points (e.g., 330), portions of the centrifugal airflow pass through the airflow passageways in the inner shell. The airflow produced by the airflow-generating device directs the debris-laden air through the passageways and through the filters. Contact with the inner shell induces debris particles in other portions of the centrifugal airflow to lose momentum and fall out of the centrifugal airflow to the collecting cone 350.

The uneven distribution of airflow passageways in the inner shell creates a graduated airflow across the open portions of the shell, such that more air passes through the shell near its bottom end than at the topmost open areas. The presence of the deflection flange 65 and graduated distribution of open area in the inner shell ensures that collected debris particles in the collection cone 350 are not rendered airborne by the centrifugal airflow in the top of the middle portion 35. The increased access through the bottom portion of the inner shell is balanced by the length of time required for the centrifugal airflow to reach such passageways from the time the debris-laden air passes through the inlet, during which time much of the heavier and/or larger debris particles are peeled off and deposited in the collection cone. As such, the amount of debris directly contacting the filters near the top perforated area is at least somewhat similar to the amount contacting the end of the filters adjacent to the bottom open areas of the inner shell sidewall.

Once on the interior side of the inner shell, the filters 70 filter the remaining portion of the debris-laden air 360. The airflow generator-produced airflow causes the air contacting the filters to be directed generally upwards through the filters 370 and into the top portion of the housing 380. The filtered air in the top portion 380 is directed to, and passes out of, the vacuum outlet 385.

In debris separation-filtration units that include filter purge system (as shown in FIG. 6), the purge inlet is closed during debris separation and filtration 390, by way of a butterfly control valve positioned at the purge inlet or in association with a purge passageway connected thereto. In systems that include a debris-scavenging tube (as also shown in FIG. 6), the debris-scavenging tube also is closed off during debris separation and filtration 395 due to the blockage by an associated check valve.

Figure 7:
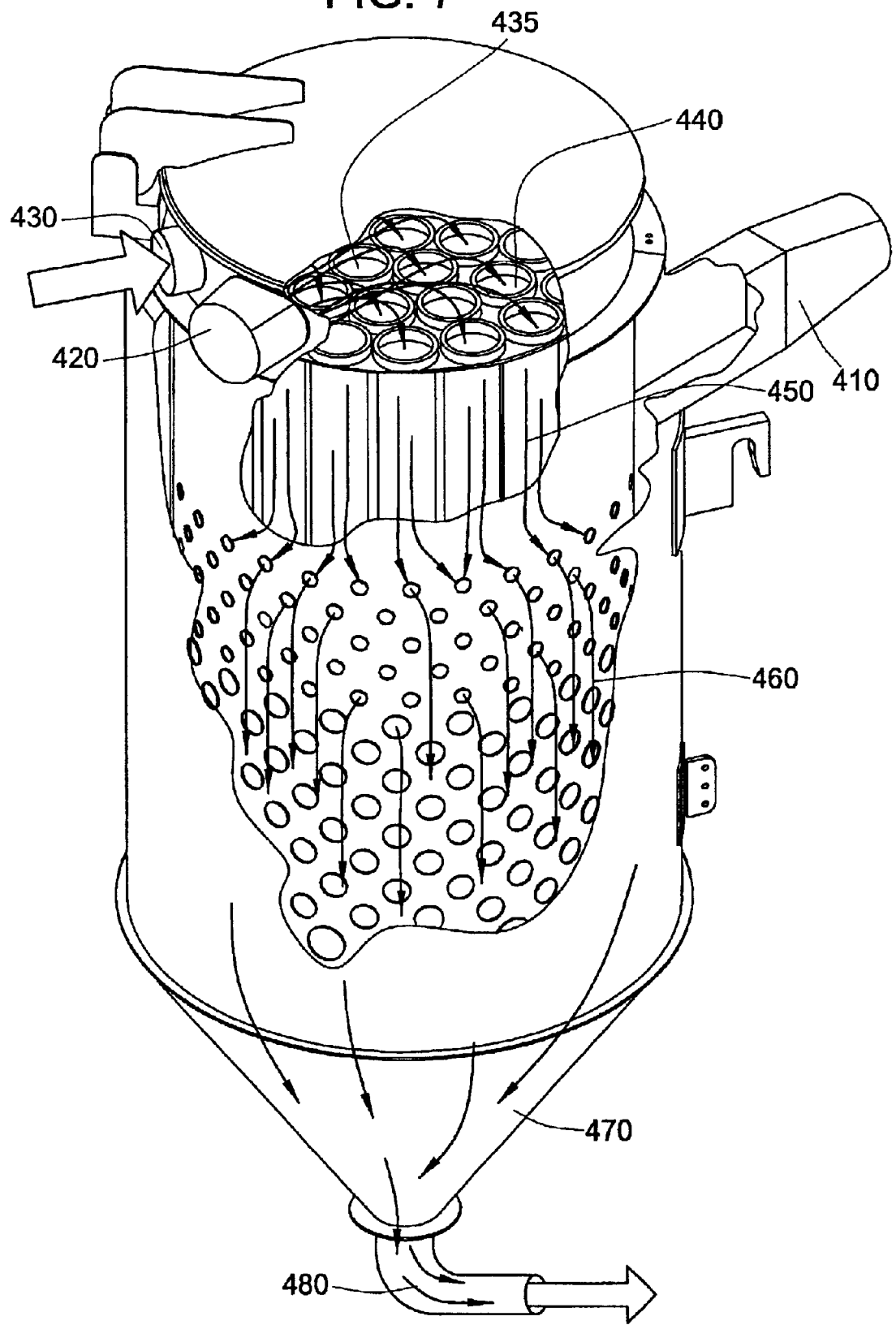
FIG. 7 portrays the path of a purging backflow of air and the flow of air and debris particles during backflow filter purging and material recovery in the representative unit shown in FIG. 1.

The operation of a preferred combined filter purge and debris-scavenging system in a representative debris separation-filtration unit of the invention is shown in FIG. 7. In purging/debris scavenging mode, the flow of debris-laden air into the inlet is blocked off 410 by closure of a control valve or blockage by a check valve in the inlet or upstream of the inlet (e.g., a control valve located at the interface of the inlet and the housing, or at the beginning of or in a transport tube that communicatively engages the inlet (the latter being preferred) blocks the inflow of debris-laden air). Similarly, the vacuum outlet of the unit is blocked off 420, such that airflow to the exhaust and environment is halted. With the closure of these passageways, the interior of the debris body is placed in a state of negative pressure with respect to the environment due to operation of the vacuum.

A filter-purging airflow enters the unit through the purge inlet 430, due to a pressure gradient created by connecting the purge inlet to a source of relatively high pressure (e.g., the environment) and/or the output of an airflow generator (e.g., the directed positive displacement from a PD blower). After passing through the purge inlet, the purging airflow travels across the top portion of the housing 435, towards and downwardly into the tops of the filters 440. The purging airflow travels through the filters and disperses outwardly through the filter media 450, while retaining a generally downward flow 460. The backflow through the filters, causes bound debris particles to be released from the filter media, which released debris thereafter fall into the collection cone. As the purging backflow reaches the bottom of the housing, the collected debris are moved to the bottom of the collection cone 470, and into the open debris-scavenging pathway 480, and thereafter into an associated debris body.

The pressure differences in the components of the system during debris separation and filtration are significantly less than the differences in pressure used to purge filters in an AABPS purge system. During debris separation and filtration, the pressure at the vacuum-generating blower of the system typically is at about 7–10 inches of mercury and the pressure in the debris body is at about 5 inches of mercury. A pressure difference exists between the bottom of the collection cone and the interior of the collection tank (this and other pressure differences in the units and systems described herein can vary with a number of factors). In contrast, an AABPS originates at the exhaust (at atmospheric pressure—i.e., about 30 inches of mercury) or some component near atmospheric pressure (e.g., the muffler).

Figure 14:
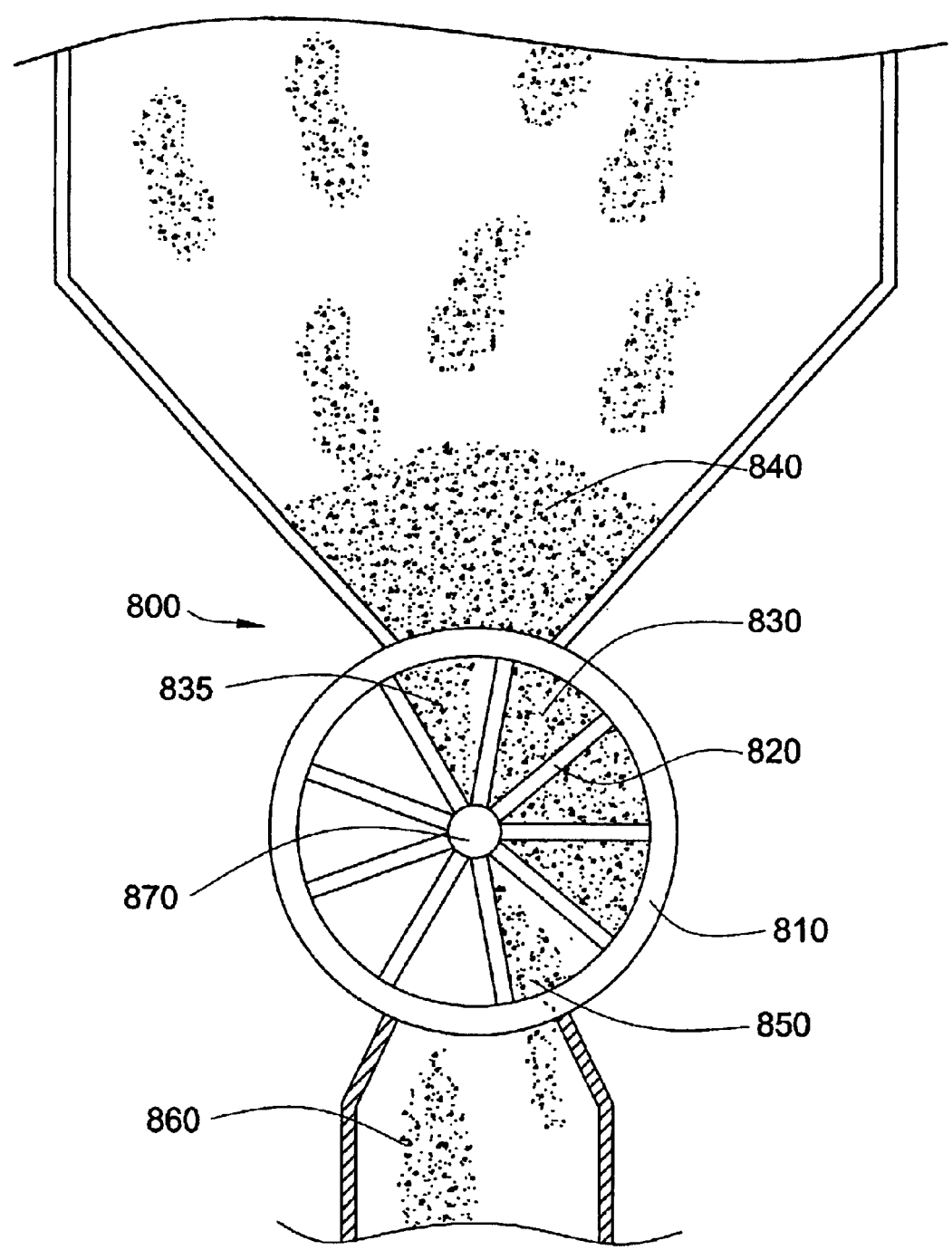
FIG. 14 depicts another alternative separation-filtration unit of the invention comprising a representative mechanical air gate-associated material recovery system.

A representative debris separation and filtration unit 800 comprising an air lock material recovery system 810 is depicted in FIG. 14. In the unit 800, the debris-collecting bottom portion comprises a collection cone, the bottom end of which 840 engages the rotating air lock 810. The air lock 810 comprises a number of spaced apart paddles 820 or functionally similar structures protruding out from a central rotational wheel axis 870. The spaces between the paddles form debris pockets 830. When the air lock 810 is stationary, one of the paddles typically is oriented such that debris accumulating in the bottom end of the housing does not enter the material recovery passageway 860 associated with the unit and the associated unit remains substantially airtight. In operation, a selectively operable motor causes the wheel to rotate, such a space opens and accumulated debris are permitted to fall into a first pocket 830, a second pocket 835, and so on, as the wheel rotates. At the opposite end of the air gate 850, debris in the pockets is released into the material recovery passageway 860 as the pockets pass over the entry to the passageway. The material recovery passageway permits the debris to be transported to the debris body or other suitable repository by gravity or by the assistance of a blower or mechanical device in or associated with the passageway.

Figure 8:
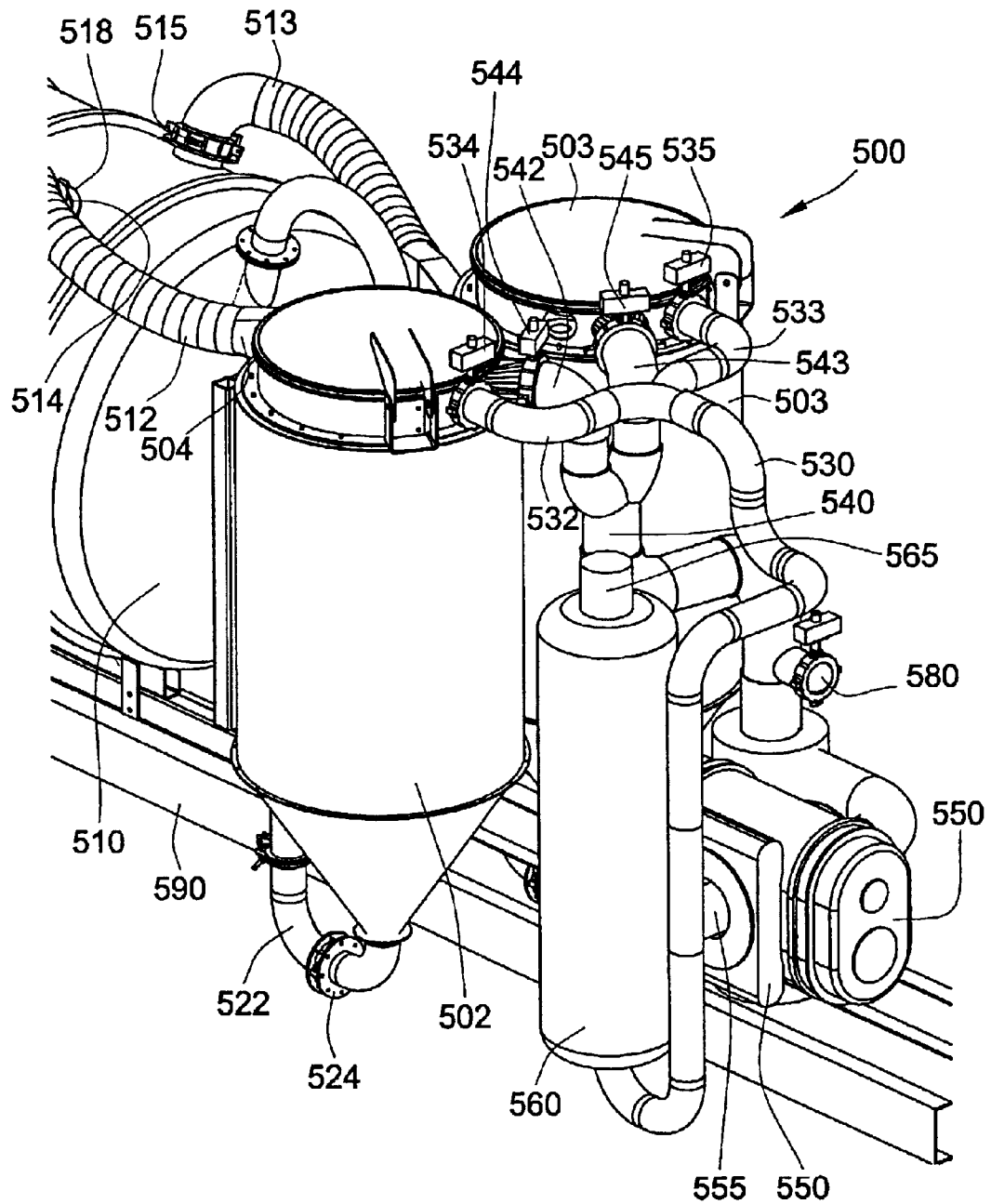
FIG. 8 provides a front-to-back top isometric view of a debris collection, separation, and filtration system of the invention comprising two centrifugal separation-filtration units in parallel association with a debris body and a vacuum-generating positive displacement blower.
Figure 9:
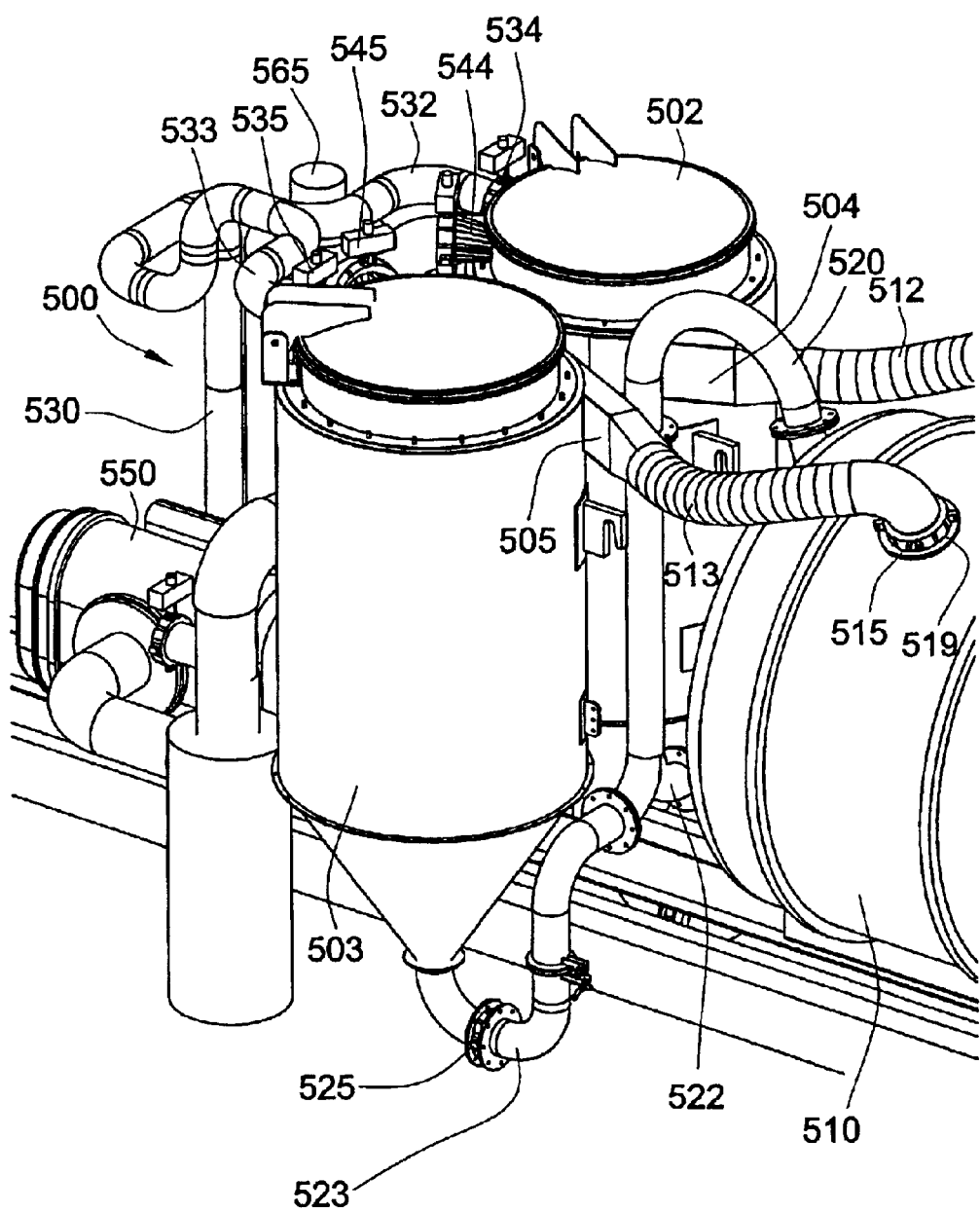
FIG. 9 provides a top isometric view of the exemplary dual centrifugal separation-filtration and debris collection system shown in FIG. 8, as seen from the perspective of the opposite side and end of the system.

An example of a dual centrifugal filtration-separation system of the invention 500, in comprising two separation-filtration units operably associated with a debris body 510 is shown in FIGS. 8 and 9. Each of the first and second debris filtration-separation units 502 and 503 have a three-section housing, an inner shell having a number of airflow passageways, and a debris-collecting filter system, as described above. The system further includes a number of airflow passageway-forming structures connecting the units and other components of the system.

Specifically, the first and second inlets 504 and 505 communicatively engage first and second debris transport vacuum hoses or passageways 512 and 513, respectively. At the opposite side of the hoses from where the first and second debris transport hoses 512 and 513 engage first and second outlet ports, 518 and 519, respectively, which outlet ports are formed in opposite sides of the top end of the debris body 510. The debris transport hoses are flexible vacuum hoses made of wire-reinforced rubber, having a diameter of about 8 inches and a length of about 4 feet. The debris transport hoses also are characterized in having a smooth bore with a smooth inner liner that prevents air turbulence.

Near the point where the debris transport hoses engage the debris body outlet ports, passive debris transport tube control valves are located (e.g., second debris transport tube control valve 515 is positioned at or near the second outlet port 519). The debris body control valves are wafer-style check valves that permit airflow in the direction of the separation-filtration units, but preclude airflow in the opposite direction. When a sufficient airflow traveling towards the unit or units contacts the check valve, the debris transport passageways 512 and/or 513 permit debris-laden air through the debris body 510 to be delivered to the inlets 504 and/or 505.

First and second debris scavenging passageways 522 and 523 communicatively engage the first and second units 502 and 503, respectively. Each of the debris scavenging passageways is formed from multiple steel sections sealingly joined at separation flanges. Each of the passageways has a diameter of about 4–6 inches a thickness of about $3/16$th inch. The smaller diameter of the purge passageways and debris scavenging passageways, as compared to the other passageways, causes the velocity through these passageways to be faster than the airflow velocity in the vacuum passageways and the debris transport passageways (which latter two sets of passageways are usually about 1.5–2 times (1.5–2×) as wide as the former passageways, i.e., about 8 inches). Alternatively, a ribbed vacuum hose can replace some or most of the steel sections. Where a ribbed vacuum hose is used for the debris-scavenging passageway, a rigid U-shaped or elbow-shaped bottom portion (associated with one or more disconnect flanges) preferably is located below the bottom section of the housing, so that this portion of the passageway can be readily serviced. The first debris scavenging passageway 522 and second debris scavenging passageway 523 communicatively join to form a combined debris-scavenging duct 520. The end of the combined debris scavenging duct 520 downwardly and communicatively engages the debris body 510 on the top end of the debris body and at a point closer to the end facing the separation-filtration units than the debris outlet ports 518 and 519. The total length of a debris-scavenging passageway from the debris body to the housing of a debris separation-filtration unit is about 10 feet.

Positioned near the bottom of U-shaped portion of the first debris scavenging tube 522 is a debris scavenging passageway check valve 524 that allows flow to the debris body when a sufficient airflow traveling from the first unit to the debris body is applied. Similarly positioned with respect to the second debris scavenging tube 523 is a second debris scavenging tube check valve 525.

A first purge tube 532 communicatively engages the top manifold section of the first separation-filtration unit 502 and a second purge tube 533 communicatively engages the top manifold section of the second separation-filtration unit 503. The purge tubes are formed of ¼-inch thick steel and have a diameter of about 4 inches. The first or second purge tubes, 532 and 533, respectively, meet and merge to form a combined purge tube 530. The combined purge tube 530 communicatively engages a muffler 560, which muffler releases and/or receives air from an exhaust 565. The average distance purged air must travel in the first or second purge tube, in combination with the combined purge tube, from the muffler to the associated unit, is about 16 feet.

A selectively operable first purge tube control valve 534 engages the first purge tube 532 at the point where the first purge tube engages the first unit 502. Similarly, a second purge tube control valve 535 is positioned at the point where the second purge tube 533 engages the second unit 503. The purge tube control valves 534 and 535 normally are butterfly valves or other rotational high recovery gated control valves as described above. When engaged, a purge tube control valves close off the purge tubes it is associated with, thereby blocking movement of debris particles and air through the purge tube(s).

Also engaging the top manifold section of the first unit housing and second unit housing are first and second vacuum tubes 542 and 543, respectively. The vacuum tubes are formed of ¼-inch thick steel having a diameter of about 8 inches. Each of the vacuum tubes 542 and 543 slopes downward and inward toward the other tube until the tubes meet and communicatively merge to form the combined vacuum tube 540.

The combined vacuum tube 540 communicatively engages the PD blower assembly 550. The system is equipped with an emergency relief valve 580 that, when engaged, delivers an airflow under positive pressure into the vacuum passageways that at least temporarily counteracts the force of the vacuum. The relief valve 580 can be associated with a blower, source of pressurized air, etc., to provide such a counteracting pressure.

The first vacuum tube 542 engages a first vacuum tube control valve 544 at a position near the top manifold section of the first unit. Similarly, the second vacuum tube 543 engages a second vacuum tube control valve 545 near the top manifold position of the second unit housing. The vacuum tube control valves are butterfly valves that are activated as described above by signals from selected detectors positioned in the collection cones of the units.

The debris body 510 is about 10–12 feet long (preferably about 12 feet long), about 7–8 feet deep, has a maximum width of about 7–8 feet, and a total volume of at least about 10 cubic yards, preferably at least about 12 cubic yards (e.g., about 12–16 cubic yards), and more preferably about 16 yards. Typically, the debris body 510 can hold up to about 30,000 pounds of material. The debris body 510 is made of ¼ inch thick steel. A debris entry port 511 located on the side of the debris body 510 opposite the units 502 and 503, receives airborne debris particles by way of a vacuum hose or other suitable debris collection device (see, e.g., FIG. 10), examples of which are discussed elsewhere herein. The bottom ½ of this side of the debris body 510 also preferably serves as a selectively openable door 570 (see, e.g., FIG. 12), which is selectively opened in dumping or emptying of the debris body 510 by operation of a hydraulic system.

Operation of the control valve system causes either of the separation-filtration units 502 or 503 in the dual unit system to cease separating and filtering debris-laden air and subject the filter of the unit to a purging backflow, while the other unit continues to separate and filter airborne debris. Two ultrasonic particle detector detection devices are placed, individually, in the collection cones of the units, 502 and 503, such that when a large number of particulates collect in a unit, the ultrasonic particle detector of the unit sends an electric signal to the associated vacuum tube control valve and purge tube control valve, thereby causing the associated vacuum tube control valve thereby closing the associated purge tube control valve and causing the associated debris scavenging tube check valve to open. In so opening and closing these valves, the unit ceases to receive and process debris-laden air and, instead, receives a purging backflow that causes at least a portion of the debris in the filters of the unit to be released and at least a portion of the released and collected debris to be transported to an associated debris body. Where all rotational/positive movement gated control valves are used, the signal also causes the control valves associated with the debris scavenging tube and debris transport tubes to respondingly open or close.

Figure 10:
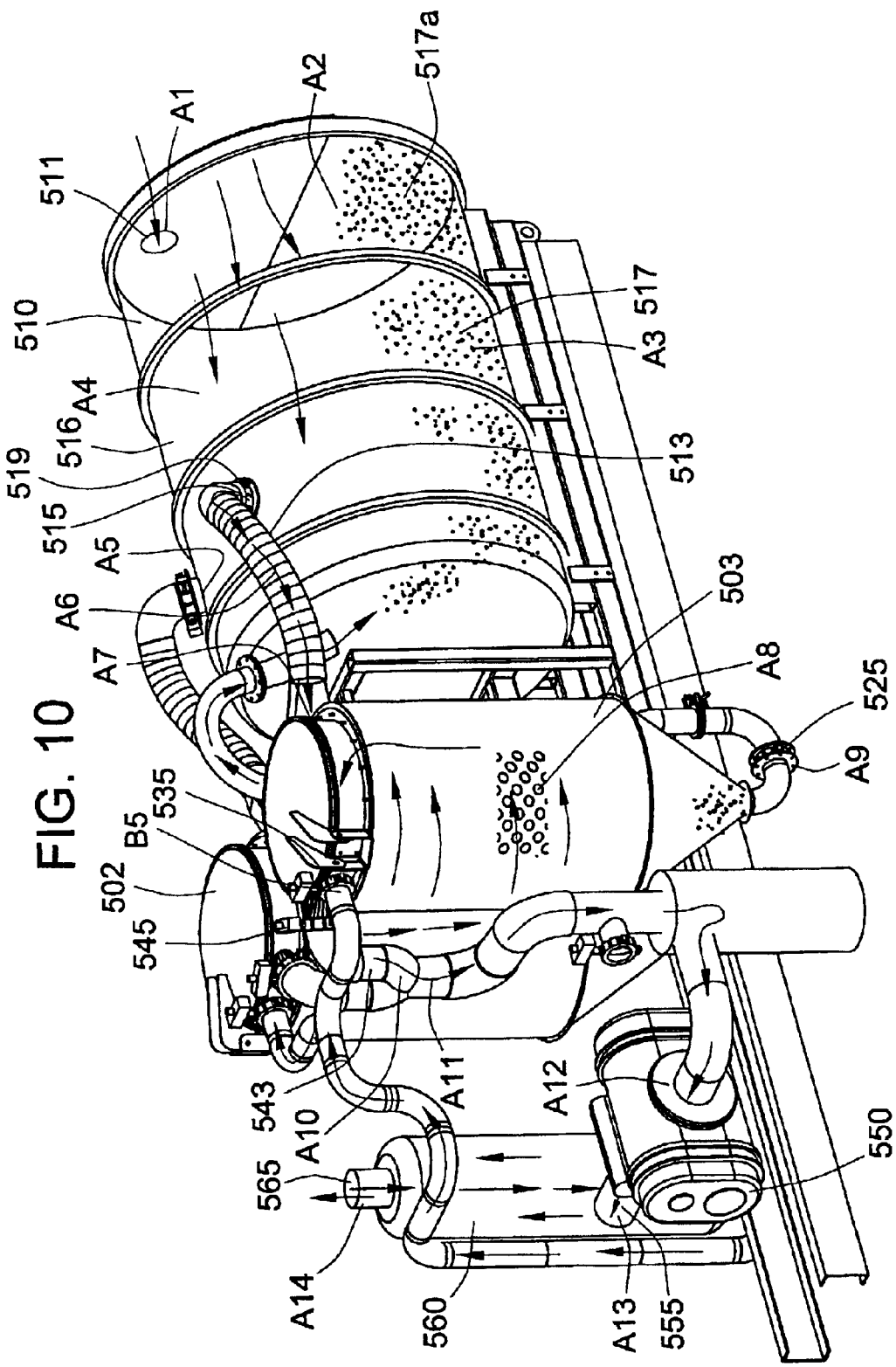
FIGS. 10 and 11 illustrate (through partial see through views) the flow of air and debris through the exemplary debris collection, separation, and filtration system of the invention shown in FIGS. 8 and 9, where the first debris separation-filtration unit of the system is used to separate and filter debris while the filter in the second unit of the system is purged by a preferred backflow purge system.
Figure 11:
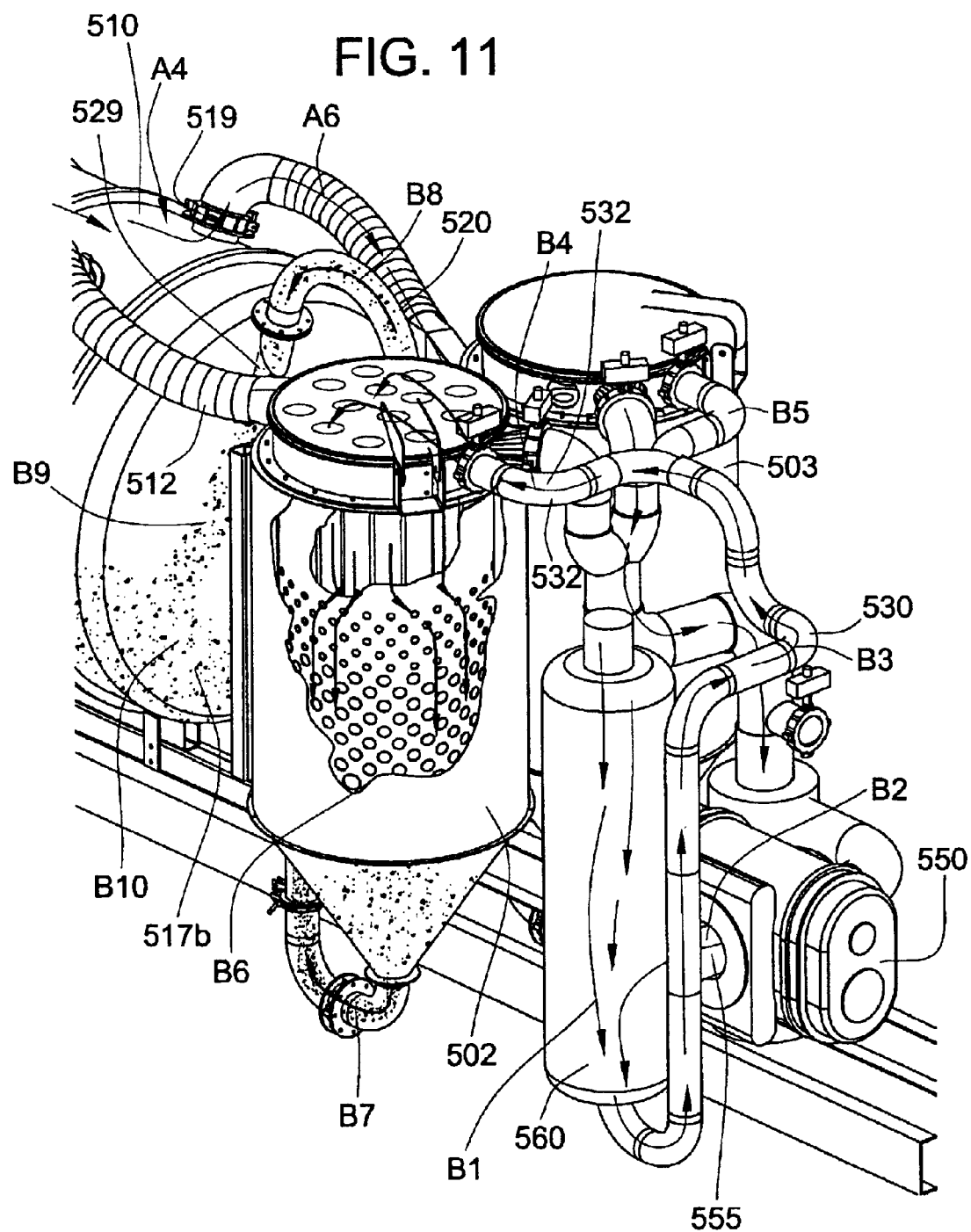

To further illustrate the independent functionality/dual modality of a dual centrifugal separation-filtration system of the invention, the airflow through such a system is depicted in FIGS. 10 and 11. Specifically, FIGS. 10 and 11 depict a situation where a first debris separation-filtration unit 502 is in a combined AABPS/PBPS purge mode and a second separation-filtration unit 503 is in debris separation and filtration mode. The flow of air and debris particles through the system is shown as two discrete paths. The first or "A" airflow corresponds to the flow of debris-laden air through the debris collection tank, into and through the second separation-filtration unit 503, and the flow of filtered air therefrom to an exhaust. The second or "B" path corresponds to the flow of purging air from a relative high pressure area and from a positive purge passageway into and through the first unit and the movement of collected debris from the collection cone of the first unit 502 into the debris body 510.

In operation, the PD blower is run at about 2,000 RPM, thereby generating a negative pressure upstream of the blower assembly. The air pressure on the upstream side of the blower assembly is usually about 5–10 inches of mercury.

A vacuum hose of about 15–30 feet in length (optimally about 20 feet in length) (see FIG. 13) captures debris from target areas by the suction force generated by the vacuum and applied at the end of the hose. The air pressure at the end of such a vacuum hose is usually about 3–8 inches of mercury. The captured debris is rendered airborne and enters the debris body 510 at an entry port 511 (A1), such that air initially enters the top interior of the debris body 516. Although closer to the vacuum than the collection device, the interior of the debris body 510 typically has a significantly larger diameter than the associated debris collection device and, as such, much of the debris-laden air disperses and slows upon entering the collection tank. Due to this dispersion and slowing, and in view of the significant length of the debris body 510, a substantial proportion of the debris particles in the airflow entering the debris body fall out of the airflow (A2) before reaching the other side of the tank. These heavier and/or larger debris particles are deposited in the bottom interior of the debris body 517 (A3), where they normally are retained until the debris body is cleaned, dumped, or otherwise emptied.

Airflow in the debris body 510 primarily travels across the top interior 516 (A4) to the second outlet port 519 as the vacuum only acts on the second debris transport tube when the second unit 502 is in purge mode. The first debris transport check valve 514 prevents transport of debris to the debris body from the first unit (A5).

Because the draw of the vacuum is strongest near the top of the tank 516 and at a significant lengthwise distance from the entry port 511, most of the debris particles deposited in the bottom interior of the tank 517, do not re-enter the airflow moving across the tank 516 (A4). Accordingly, at least a significant proportion of the airborne debris entering the debris body 510 does not enter the separation-filtration units 502 and 503.

Debris-laden air passing through the open second debris transport tube control valve 515 flows through the second debris transport tube 513 (A6). The debris-laden air passes through the second inlet 505 (A7) and thereafter tangentially enters the centrifugal separation chamber of the second debris separation-filtration unit 503, such that a centrifugal airflow is formed therein (A8). A portion of the centrifugal airflow contacts and is blocked by nonperforated portions of the inner shell and another portion passes through the shell and thereafter is filtered by the filters (A8).

Because the second unit 503 is in debris separation and filtration mode, the second debris scavenging tube check valve 525 blocks debris particles from passing through the second debris scavenging passageway 523 in the direction from the debris body to the unit and from the unit to the debris body as the pressure on the collected debris is not strong enough to open the check valve and the check valve allows flow only to the debris body from the unit (A9). As such, debris particles are collected in the collection cone of the second unit.

The second vacuum tube control valve 545 open when the second unit 503 is in purge mode. Filtered air thus flows freely into the second vacuum tube 543 from the top manifold section of the second unit 503 (A10). Because the second unit 503 is not in purge mode, the second purge tube control valve 535 is closed (B5) and no airflow passes between the top manifold section of the second unit 502 and the second purge tube 533. Having exited the second unit 503 through the second vacuum tube control valve 545, the filtered air flows through the second vacuum tube 543 and thereafter through the main vacuum tube 540 (A11). At a point upstream of the blower housing 550, typically at the end of the main vacuum tube 540, the filtered air passes through a low capacity filter, such as a wire mesh or screen filter. The mesh screen captures debris particles of about 100 microns or larger, without substantially impacting the rate of airflow from the unit 502 to the blower assembly 550. A mesh screen having about 100 mesh openings can be suitably used as such a back-up filter. The back-up filter prevents damage to the fan that may be caused by large debris particles passing through the system in the event a hole develops in the filters or some other type of filter failure occurs.

Having passed through the back-up filter, the filtered air enters the multiple-lobed PD blower assembly 550 (A12). A system of the invention can include any suitable type of blower. Multiple-lobed (particularly, three-lobed) PD blowers are preferred. Alternatively, a centrifugal fan/blower can be used. In the blower assembly, the filtered air is engaged by one of the lobes and transported through the blower where it marries air on the atmospheric or downstream side of the blower. The filtered air passes through the blower assembly 550 and is propelled by the positive force of the blower away from the blower assembly 550 and towards the exhaust 565.

To reduce system noise, air blown out of the fan housing 550 is directed into a muffler/silencer 560, by way of an interconnecting passageway 555 (A13). The muffler/silencer can be any suitable type of device that reduces system noise, usually by an acoustic dampening mechanism tuned to counteract the frequency of the blower. Air passing through the muffler 560 flows upwardly to the exhaust 565, where the air is released into the environment (A14). A majority of the debris particles of about 5–10 microns or more in diameter that entered the system 500 is captured by the system prior to release. Characterized another way, the exhausted air is substantially free of such particulates.

When an ultrasonic detector in a separation-filtration unit determines that an undesirable level of debris has accumulated in the unit's collection cone, a signal is send to the vacuum passageway control valve and purge passageway control valve associated with the unit, which respondingly open the associated purge passageway and close the associated vacuum passageway, such that the filter of the unit is purged. Filter purging normally is a temporary event. When the valve settings associated with a particular unit are changed to purge mode, the valves normally remain in their purge mode positions until a set period of time has passed, the condition(s) that induced the unit to enter purge mode have changed, or a combination thereof has occurred.

In the situation depicted in FIGS. 10 and 11, the first unit 502 is in purge mode. As such, the first purge passageway control valve 534 opens and the first vacuum passageway control valve 544 is closes for a set period of time, in response to signals from the ultrasonic detector in the first unit's collection cone. The opening of the first purge passageway control valve 534 motivates and permits air to flow from the exhaust/muffler (560/565) into the top manifold section of the second unit 502, by way of the combined purge tube 530 and first purge tube 532. Because the muffler is at atmospheric or near atmospheric pressure, a backflow of ambient air (an AABPS purge) is generated (B1). The AABPS purge produces a single, large volume backflow of ambient air (e.g., about 250 cubic feet of air) that contacts the filters at an airflow rate of about 4,000 cubic feet/minute (CFM). A purge flow rate that is about equal to the vacuum flow pressure rate is typical and preferred in all backflow purge systems. Typically, air also is positively fed from the output of the PD blower 550 to the lower portion of the muffler 560 (B2). During normal operation, the positive displacement passageway 555 receives positively displaced filtered air from the blower 550 and directs it to the muffler 560 (A13) for release to the environment (A14). When the purge passageway is opened, such air will marry atmospheric air in the exhaust and travel to the unit as an AABPS. The system can also include a PBPS that comprises or consists of one or more passageways that specifically and selectively direct the output of the blower into the purge passageway, such that the filter of the unit can be purged even when the pressure differences between the debris body 510 and the muffler 560 is dissipated. Other suitable configurations can be used to re-route air displaced from the blower to the unit(s) so as to generate a PBPS (e.g., the muffler can be partially closed off when both units receive a positive displacement purge). The amount of filtered air released from the exhaust (A14) when one of the units is in purge mode, as depicted in FIGS. 10 and 11, is usually relatively small (as compared to when both units are in debris separation-filtration mode), because both filtered and atmospheric air is delivered into the open purge passageway from the muffler 560 so long as a pressure gradient exists between the debris body and the muffler.

Whether in an AABPS, PBPS, or combined purged system, all of the purging airflow moves through the combined purge tube 530 (B3), due to the pressure gradient from the purge tube 532 to the interior of the debris body upstream of the first unit and/or the positive displacement of the blower. Essentially all of the purging airflow travels from the combined purge tube into the open first purge tube 532 (B4) in the direction of the first unit 502. If any air enters the second purge tube 533, it is met with the closed second purge tube control valve (B5). After passing through the first purge passageway control valve 534, the purging backflow purges the filters (B6), essentially as described elsewhere herein.

After purging the filters, the backflow contacts the debris gathered in the collection cone of the first system 502 and motivates the collected debris to pass through the first debris scavenging tube check valve 524 and into the first debris scavenging tube 522, (B7). The scavenging airflow and associated debris particles travel through the first debris scavenging passageway into the merged debris scavenging tube 520 (B8).

The end of the merged debris scavenging tube 520 engages the top end of the debris body 510 on the side of the tank closest to units 502 and 503. As seen in FIG. 10, the debris scavenging tube 520 includes a downwardly-oriented outlet portion 529, which extends about 12 inches below the top of the debris body 510, and is located about 3 feet from the second outlet port 519 towards the end of the debris body nearest to the units. Scavenged/recovered debris is downwardly released from the outlet 529 (B9) and deposited in the bottom of the debris body 514 (B10) on the side of the tank nearest the units 502 and 503 (i.e., 517*b*—see FIG. 10). The positioning of the outlet prevents recovered/scavenged debris from contacting the flow of debris-laden air across the top of the debris body. Because most of the collected debris deposited in the debris body fall out of the "A" airflow on the opposite side of the tank (517*a*—see FIG. 11), the scavenged debris do not usually raise the maximum height of the debris in the collection tank. The distribution of the collected debris on one side of the debris body and the scavenged/recovered debris on the other side helps to ensure that the "A" airflow is able to continue to cross the debris body.

Figure 12:
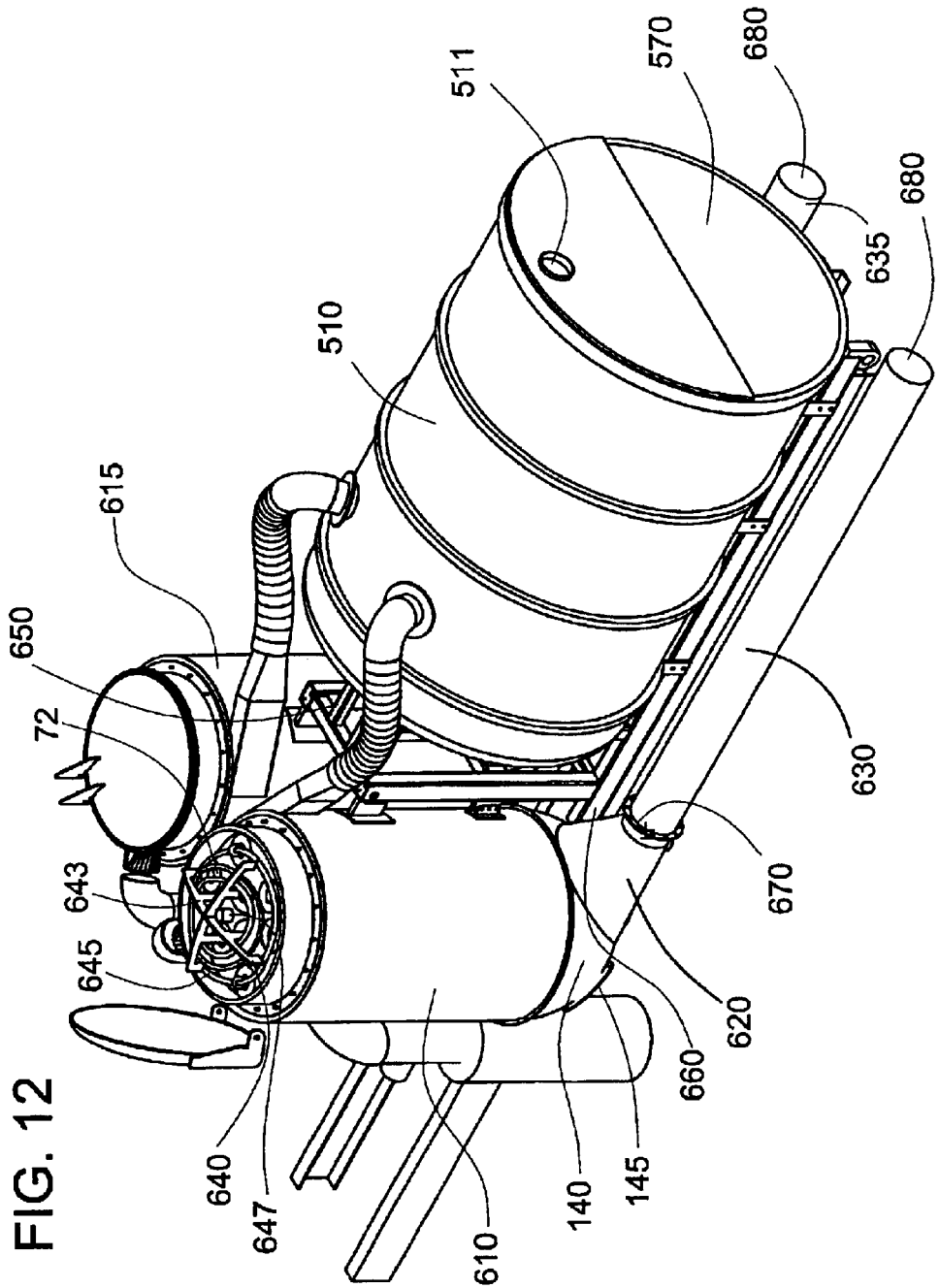
FIG. 12 provides a top isometric view of another representative dual centrifugal separation and filtration system of the invention comprising a dumping debris removal system and an air cannon filter purge system.

Another representative dual centrifugal separation-filtration system of the invention, shown in FIG. 12, uses an air cannon and debris dumping system rather than a backflow purge and scavenging system. Specifically, the system 600 includes a first debris separation-filtration unit 610 and second debris separation-filtration unit 615, each of which units have a semi-hemispherical bottom debris collecting portion 140 that communicatively engages a long cylindrical dump tube. Specifically, a first dump tube 630 is communicatively connected to the semi-hemispherical bottom portion 140 of the first unit 610, through a lengthwise-oriented funnel shaped transition section 620 and flange member 670; and a second dump tube 635 similarly engages the semi-hemispherical bottom portion of the second unit 615. The ends of the dump tubes, opposite the units, engage selectively openable doors 680, the opening and closing of which doors is linked to the opening of the debris body dump door 570, which, in turn, is regulated by a selectively operable standard hydraulic system. When the frame on which the tubes and collection tank are mounted is raised for dumping, the debris body dump door 570 and the dump tube dump doors 680 open, thereby gravitationally releasing the collected debris particles in these containers.

The first and second units, 610 and 615, and debris body 510, are removably mounted to an upright support 650, which upright support 650 forms a part of, is welded to, or otherwise securely connected to a support frame 660. The support frame 660 can be mounted on the frame or chassis of an associated vacuum truck or other debris-collecting vehicle and is associated with a selectively operable hydraulic or other suitable lifting mechanism (not shown). The lifting mechanism can be any type of device capable of raising the debris separation-filtration units, 610 and 615, and the debris body 510 to a height at which debris will fall through the open debris body door 570 and from the open ends of the dump tubes. In other words, the lifting system, when engaged, lifts the support frame 660 to a height at which the dump tubes 630 and 635 are sufficiently slanted such that debris collected in the semi-hemispherical bottom portions of the units gravitationally slide through and out of the dump tubes.

Each of the units, 610 and 615, also include an air cannon purge system 640. The air cannon 640 includes two concentric rings of tubing 645, in which, at points near the tops of the filters 72, purge jets are positioned. The air cannon rings 640 are supported by a frame 643, which typically is connected to the edge of the housing sidewall or to the lid 22. The system also includes a compressed air tank and purge valve assembly 647, the body of which tank and valve assembly is contained below the tube plate. When operated, compressed air is released from the purge valve 647 and travels through the rings of tubing and through the accessible and open purge jets, from which jets a purging blast of backflow is downwardly delivered into the tops of the filters, such that at least a portion of the debris particles retained in the filters are released.

The purge jets preferably are positioned about 1 to about 3 feet from the purge valve (a distance of about 1 ft. or less is particularly preferred). The nearness of the purge jets to the purge valve ensures that less air and air force is wasted in the tubing leading to the jets. The purge jets also or alternatively are functionally divided, such that only about 4–5 filters are purged with each blast. In such systems, each pulse of air provides a much stronger purge blast and more effectively cleans the filters. Selective control over the purge jets can be obtained by any suitable technique including, e.g., the use of suitable control valves.

Figure 13:
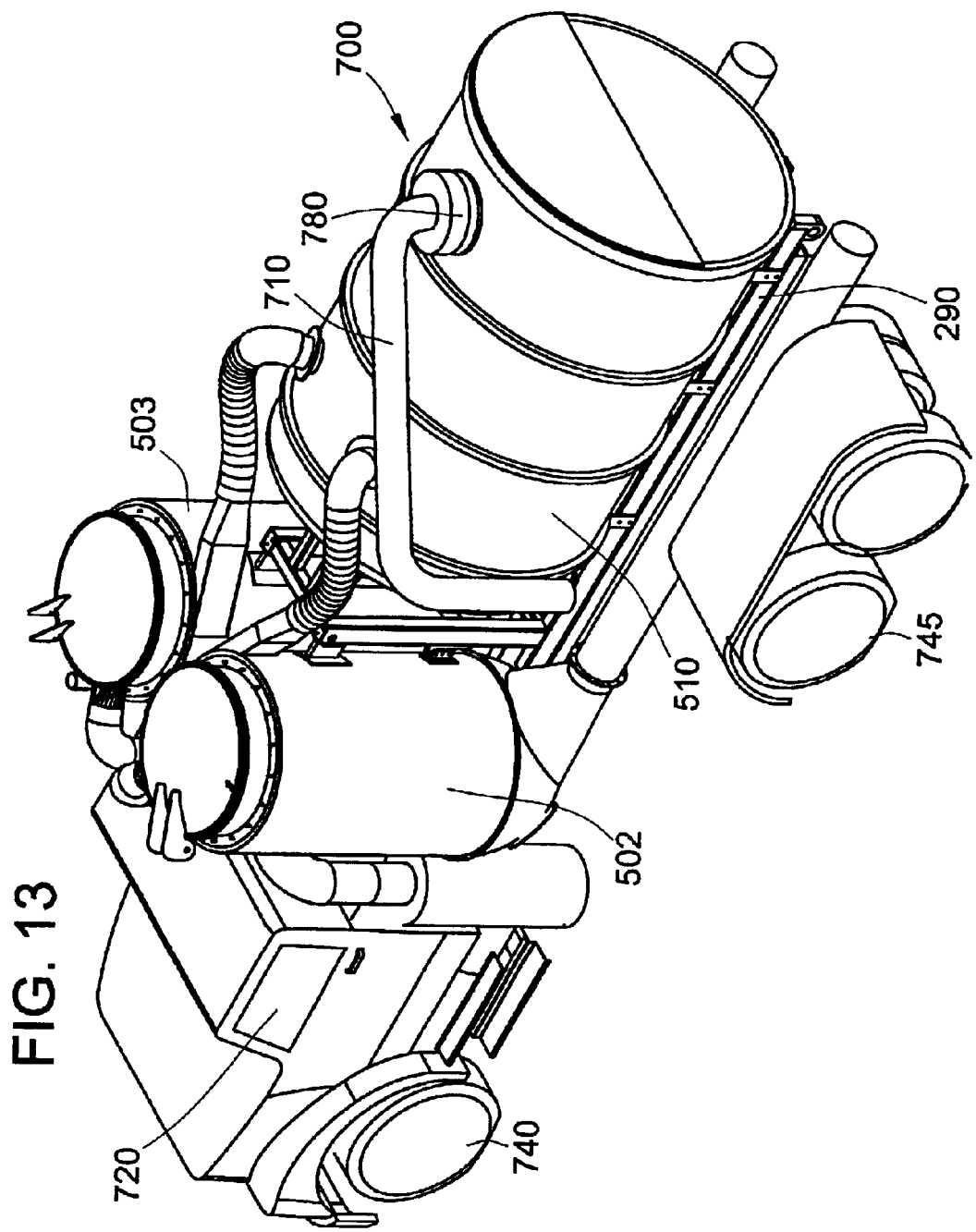
FIG. 13 shows an exemplary vacuum truck comprising a dual centrifugal separation and filtration system according to a preferred aspect of the invention.

An example of a vacuum truck comprising a representative dual centrifugal filtration system of the invention is depicted in FIG. 13. The truck 700 includes standard front and rear wheels, 740 and 745, a front hood area in which a vehicle engine is enclosed, a cab 720, first and second debris filtration-separation units 502 and 503, and a debris body 510, which units and debris body are located on a liftable/tiltable support frame 290 that can be optionally, in turn, associated with a main frame or chassis of the truck. The cab 720 includes control and monitoring systems for operation of the vehicle and the debris collection, separation, and filtration system such as a blower tachometer/hour meter, blower temperature gauge, and monitors that report when signals are sent from the detectors to ACS. Preferably, an operator can manually govern and override the operation of the ACS when desired. The truck 700 also is fitted with a removable and flexible debris-collecting vacuum hose 710, which hose, in operation, allows an operator to capture debris from a target area or surface and delivers the debris by a sucking airflow that delivers debris-laden air into the debris body by way of a rotatable top boom 780. Rotation of the boom 780 allows the user to use the vacuum hose in a wide range around the periphery of the vacuum truck. The top boom 780 is positioned at a point sufficiently far from the ends of the debris transport tubes such that a substantial proportion of the debris captured by the vacuum tube collection device are deposited in the debris body and only a portion of the captured debris enters the units.

The above-described debris separation-filtration units, systems, and vehicles of the invention are useful in a number of contexts including filtering air used to collect debris in steel mills, oil refineries, ship yards, chemical plants, cement plants, foundries, grain elevators, aluminum plants, pulp and paper mills, material processing plants, coal plants, power plants, and the like. Debris collecting vehicles comprising multiple-unit systems of the invention are particularly advantageous in the collection of fly ash from coal burning power plants.

The units, systems, and vehicles of the invention also can be used in wet operations, in which the target from which debris is collected is associated with a liquid. For example, the above-described vacuum truck systems of the invention can be used to collected wet fly ash in a coal power plant, and separate and filter the contaminated liquid droplets by operation of the system as described above.

Many of the individual aspects of the above-described units, systems, and methods are useful and inventive in their own right. Thus, for example, the invention provides a multi-unit debris separation-filtration system comprising two or more debris separation-filtration units, each of which unit comprises an air gate material recovery system and independently or jointly (i.e., with the other units) receives, separate, and filter debris from debris-laden air.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of referents such as "at least one" and "more than one" does not imply that elements associated with the referents "a," "an," or "the" are limited to the singular, unless explicitly stated. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A debris collection vehicle comprising at least one combined debris separation and filtration unit, the combined debris separation and filtration unit comprising:

a housing having a substantially circular cross section, which housing comprises a middle section defined by a cylindrical sidewall and a bottom debris-collecting section, wherein the bottom section of the housing has a reduced diameter as compared to the middle section, an inner shell positioned in the middle section of the housing and comprising a number of airflow passageways, the exterior side of the inner shell and interior side of the housing sidewall being spaced apart so as to form an outer chamber having a bottom end in communication with the bottom section of the housing, which outer chamber is substantially circular along its cross section, an inlet that communicatively engages the cylindrical sidewall such that debris-laden air entering the outer chamber through the inlet is directed in a substantially tangential path with respect to the substantially circular cross section of the outer chamber, and at least one filter, the sides of which at least one filter are at least substantially surrounded by the inner shell, wherein when the debris separation and filtration unit receives debris-laden air having a sufficient airflow rate a centrifugal airflow is formed in the outer chamber such that at least a portion of the debris particles in the debris-laden air is collected in the housing before debris-laden air passes through the airflow passageways of the inner shell and into the filter.

2. The debris collection vehicle of claim 1, in which the housing also comprises a top section that comprises an outlet wherein filtered air exits the debris separation and filtration unit,
  wherein the top section and middle section are separated by a filter-retaining bulkhead such that only air flow through the filters passes between the middle section and the top section.

3. The debris collection vehicle of claim 2, wherein the height of the inner shell sidewall is about equal to the height of the middle portion sidewall.

4. The debris collection vehicle of claim 3, wherein the inner shell comprises a top end, a middle section, and a bottom end, wherein essentially none of the top end is open to airflow, about 20% or more of the middle section is open to airflow, and about 60% or less of the bottom end is open to airflow.

5. The debris collection vehicle of claim 4, wherein the inner shell comprises a bottom flange extending from the bottom exterior of the inner shell, such that the distance between the exterior of the bottom flange and the interior of the cylindrical sidewall is only about ⅛th the width of the outer chamber.

6. The debris collection vehicle of claim 5, wherein the at least one filter captures debris particles of about 10 microns in diameter or larger.

7. The debris collection vehicle of claim 6, wherein the at least one filter comprises a plurality of sock filters or filter bags.

8. The debris collection vehicle of claim 6, wherein the at least one filter comprises a plurality of cartridge filters.

9. The debris collection vehicle of claim 5, wherein the average can velocity near the bottom of the at least one filter is about 200 ft./min or less when debris-laden air flows through the airflow passageways of the inner shell.

10. The debris collection vehicle of claim 5, wherein the air-to-cloth ratio of the debris separation and filtration unit is about 3.5 ft./min or less when debris-laden air flows through the airflow passageways of the inner shell.

11. The debris collection vehicle of claim 5, wherein the diameter of the cylindrical sidewall is substantially uniform throughout the middle section, the diameter of the inner shell is substantially uniform, and the cylindrical sidewall, inner shell, and at least one filters are in a concentric relationship with one another.

12. The debris collection vehicle of claim 5, wherein the debris collection vehicle further comprises an airflow-generating device, wherein the debris separation and filtration unit and airflow-generating device together define a debris separation and filtration system, and wherein operation of the airflow-generating device motivates debris-laden air to enter the debris separation and filtration unit through the inlet and draws filtered air out of the debris separation and filtration unit by way of the outlet.

13. The debris collection vehicle of claim 12, wherein filtered air is not subjected to any other filter that captures debris particles having an average diameter of about 100 microns or less before exiting the debris separation and filtration system.

14. The debris collection vehicle of claim 12, wherein the airflow-generating device is a positive displacement blower oriented such that the blower creates a negative pressure gradient in the debris separation and filtration unit and in any other components of the debris separation and filtration system upstream of and in airflow communication with the debris separation and filtration unit when operated.

15. The debris collection vehicle of claim 14, wherein the debris separation and filtration system includes a selectively openable vacuum passageway, which vacuum passageway, when open, allows filtered air to flow from the debris separation and filtration unit to the positive displacement blower and, when closed, prevents the positive displacement blower from drawing air out of the debris separation and filtration unit.

16. The debris collection vehicle of claim 15, wherein the debris separation and filtration system further includes a selectively operable filter purge system.

17. The debris collection vehicle of claim 16, wherein the filter purge system comprises a selectively openable purge passageway that communicatively engages the top section of the housing, wherein opening of the purge passageway causes a purging flow of filtered or atmospheric air to flow through the top section and into the filters in the direction opposite the direction that debris-laden air contacts the at least one filter and at a force such that at least a portion of the debris bound by the at least one filter is released.

18. The debris collection vehicle of claim 12, wherein the debris separation and filtration system also comprises at least one debris body, wherein operation of the airflow-generating device motivates debris-laden air to enter and flow across the top of the debris body, wherein at least a portion of the debris particles in the debris-laden air settle in the debris body before entering the inlet of the debris separation and filtration unit.

19. The debris collection vehicle of claim 5, wherein the debris collection vehicle comprises at least two combined debris separation and filtration units and an airflow-generating device and wherein the at least two debris separation and filtration units selectively receive debris-laden air in parallel in response to the operation of the airflow-generating device.

20. A debris separation and filtration system comprising:
  (a) first and second debris separation and filtration units, each of which debris separation and filtration units includes a perforated inner shell and a filter that is at least partially surrounded by the inner shell; wherein each debris separation and filtration unit centrifugally separates debris-laden air that it receives and filters a portion of the debris-laden air that passes through the inner shell,
  (b) a detector that generates a signal upon a passage of a period of time, the occurrence of an event, the presence of a condition, or any combination thereof;
  (c) a debris body;
  (d) an airflow-generating device that, when operated, causes the debris separation and filtration units to receive debris-laden air and filtered air to exit the debris separation and filtration units;
  (d) first and second outlet control valves;
  (e) first and second purge control valves; and
  (f) an automatic control system,
  wherein, upon receiving a signal from the detector, the automatic control system causes (i) the first outlet control valve to close and the first purge control valve to open, such that filtered and/or atmospheric air is delivered into the first debris separation and filtration unit so as to purge the filter of the first debris separation and filtration unit and pneumatically transport debris from the first debris separation and filtration unit to the debris body; or (ii) the second outlet control valve to close and the second purge control valve to open, such that filtered and/or atmospheric air is delivered into the second debris separation and filtration unit so as to purge the filter of the second debris separation and filtration unit and pneumatically transport debris from the second debris separation and filtration unit to the debris body.

21. The debris separation and filtration system of claim 20, wherein the filters are purged by a backflow of filtered and/or atmospheric air that contacts the filters in the direction opposite the direction that the portion of debris-laden air contacts the filters.

22. The debris separation and filtration system of claim 21, wherein the airflow-generating device is a vacuum-generating positive displacement blower.

23. The debris separation and filtration system of claim 22, wherein the debris separation and filtration system comprises at least two detectors.

24. The debris separation and filtration system of claim 23, wherein the detectors are ultrasonic detectors or capacitance detectors.

25. A debris collection vehicle comprising the debris separation and filtration system of claim 20.

* * * * *